US007011002B2

(12) United States Patent
Wirth, Jr. et al.

(10) Patent No.: US 7,011,002 B2
(45) Date of Patent: Mar. 14, 2006

(54) LATHE APPARATUS

(75) Inventors: John Wirth, Jr., Dubois, WY (US);
Jay L. Sanger, Casper, WY (US);
Charles H. Latven, Tajque, NM (US);
Kevin J. Fleming, Albuquerque, NM (US)

(73) Assignee: Woodworker's Supply Inc., Casper, WY (US)

( * ) Notice: Subject to any disclaimer, the term of this patent is extended or adjusted under 35 U.S.C. 154(b) by 363 days.

(21) Appl. No.: 09/922,938

(22) Filed: Aug. 7, 2001

(65) Prior Publication Data

US 2003/0029285 A1 Feb. 13, 2003

(51) Int. Cl.
B23C 7/02 (2006.01)
B23B 17/00 (2006.01)

(52) U.S. Cl. .............................. 82/142; 82/115; 82/117; 82/149

(58) Field of Classification Search ................... 82/115, 82/117, 118, 129, 133, 142, 148, 149, 158, 82/161; 409/221, 222; 29/27 R, 27 A, 27 C
See application file for complete search history.

(56) References Cited

U.S. PATENT DOCUMENTS

| 1,319,645 | A | * | 10/1919 | Clement | 82/115 |
| 2,700,912 | A | * | 2/1955 | Hardy | 116/DIG. 23 |
| 2,930,343 | A | * | 3/1960 | Derrick | 116/215 |
| 3,106,116 | A | * | 10/1963 | Pierce | 474/27 |
| 4,450,737 | A | * | 5/1984 | Hitt | 82/1.4 |
| 5,003,851 | A | * | 4/1991 | Kawada et al. | 407/117 |
| 5,186,087 | A | * | 2/1993 | McCormack | 142/1 |
| 5,282,402 | A | * | 2/1994 | Cady et al. | 82/117 |
| 6,000,447 | A | * | 12/1999 | Clay | 142/49 |
| 6,178,856 | B1 | * | 1/2001 | Caddaye et al. | 142/1 |
| 2002/0035902 | A1 | * | 3/2002 | Ericksson et al. | 82/158 |

* cited by examiner

*Primary Examiner*—Derris H. Banks
*Assistant Examiner*—Dana Ross
(74) *Attorney, Agent, or Firm*—Nixon & Vanderhye PC

(57) ABSTRACT

The lathe provided in accordance with the invention is designed to address the needs of today's bowl and spindle turners. In an exemplary embodiment, the lathe of the invention comes equipped with a 2 hp DC BALDOR motor and a state-of-the-art 3 hp MINARIK pulse-width modulated (PWM) motor drive. It has a continuous power rating of 2 hp and an effective intermittent power rating of nearly 3 hp. The lathe has three speed ranges: 0 to 600 rpm for large bowl turning, 0 to 1200 rpm for standard bowl turning and 0 to 2000 for high-speed bowl turning and finishing. A number of accessory bed extensions are available along with an outboard tool rest and tailstock.

18 Claims, 23 Drawing Sheets

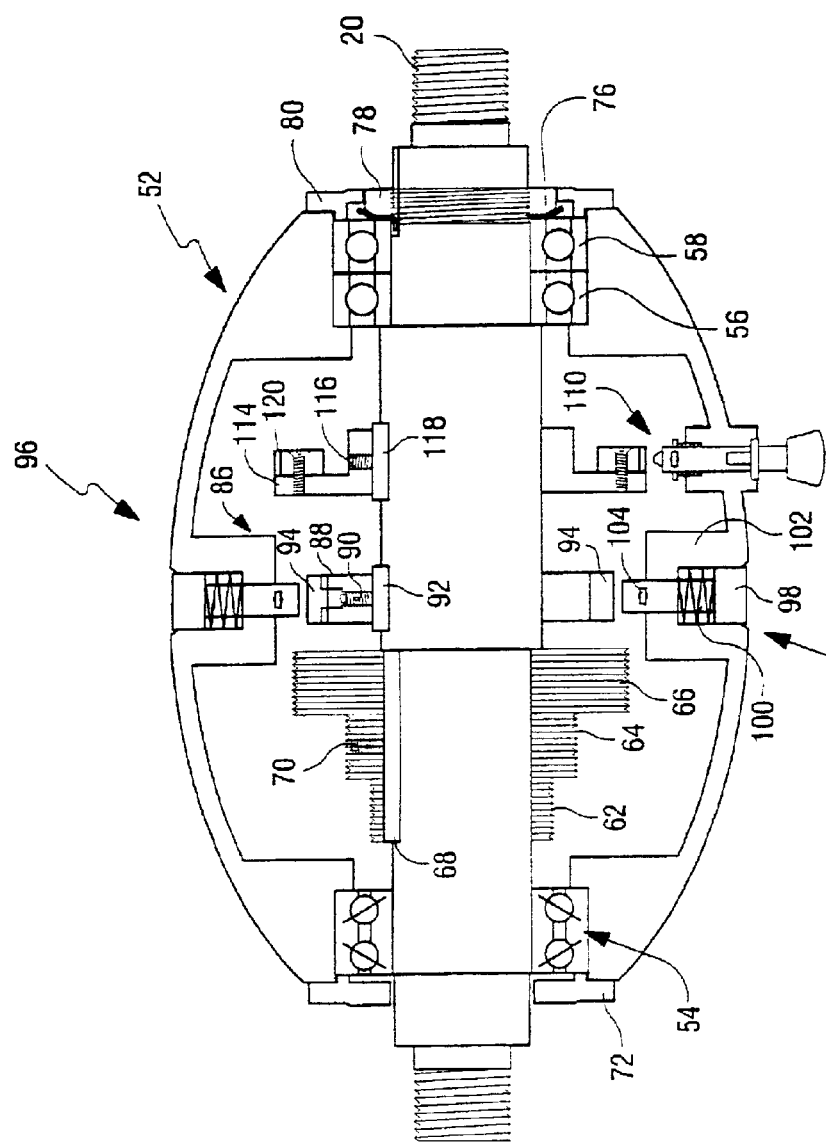
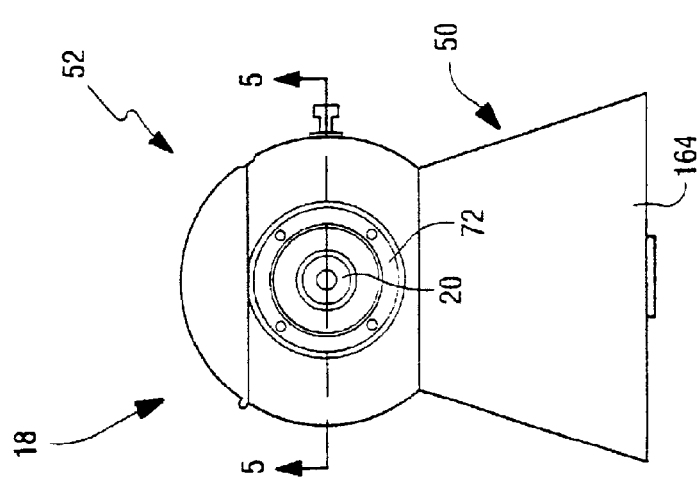
Fig. 5
Fig. 4

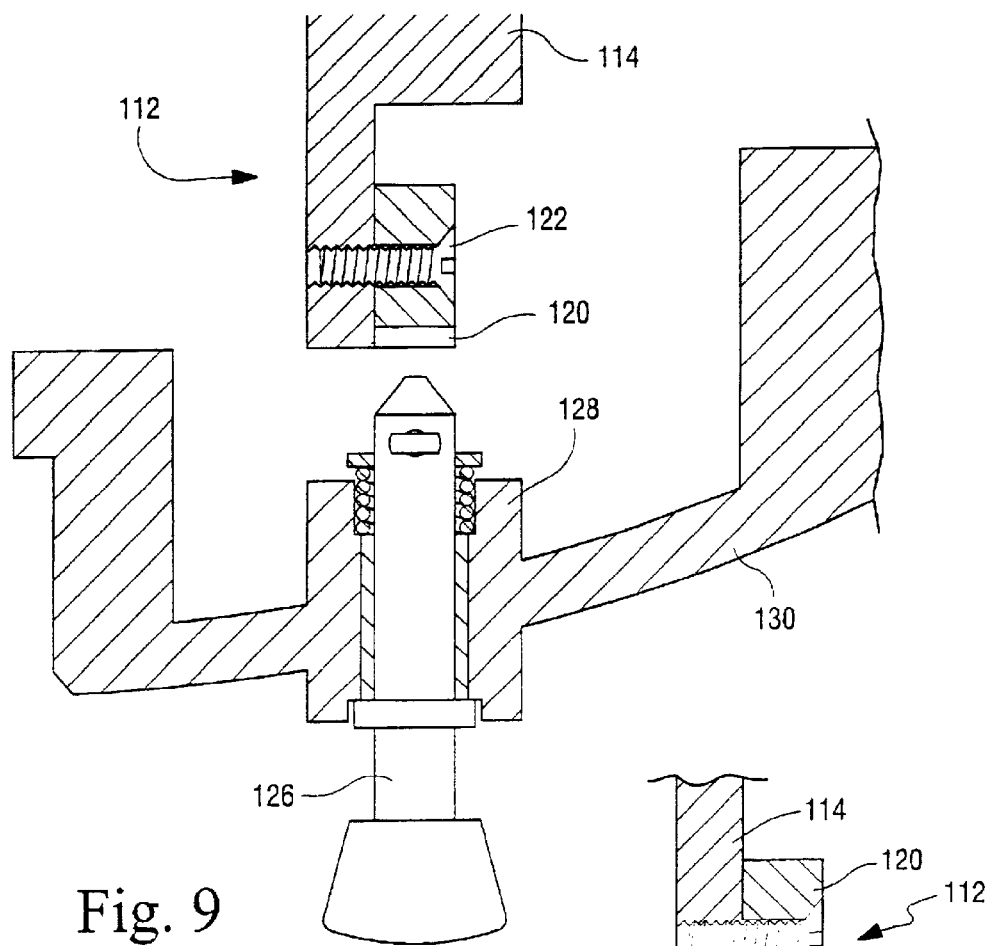
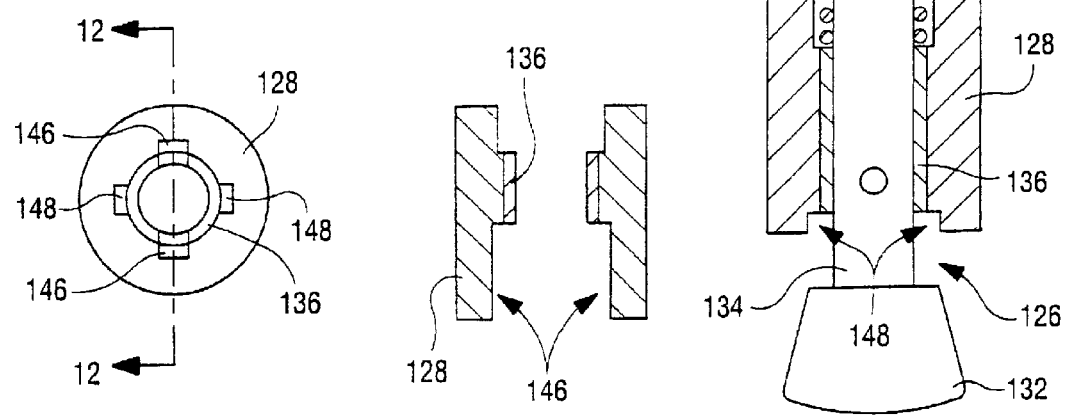
Fig. 11    Fig. 12    Fig. 10

LATHE APPARATUS

BACKGROUND AND SUMMARY OF THE INVENTION

Lathes are known for turning rotationally symmetrical elements such as bowls and spindles from a rectangular blank. Typically the workpiece is mounted between a headstock and a tailstock and rotated at high speed while a knife or knives are engaged with the rotating blank to cut and shave a desired profile into the blank. Lathes are typically used for turning wood blanks, but other materials such as metals and composite materials may be mounted and formed while turning on a lathe.

While some lathes have beds that can be raised or lowered or moved towards and away from a headstock, in general, conventional lathes have limited versatility. Indeed, it is difficult with conventional lathes to accommodate a particularly long blank, such as for a column, or a particularly wide blank, as may be provided when a bowl is to be turned. In addition, it would be desirable to provide a lathe which allows the operator to selectively lock the workpiece at any one of a plurality of incremental angular positions as may be required for surface finishing a workpiece that has been turned on the lathe.

Even further, conventional lathes tend to be boxy assemblies presenting monolithic rectangular headstocks and tailstocks which may hinder access to parts of the workpiece and/or may be uncomfortable to the operator, particularly if the operator leans on the headstock or tailstock during set-up or operation. Sharp corners may also cause minor but unpleasant injury. It would therefore be desirable to provide a more ergonomically shaped, smoothly contoured headstock and tailstock to minimize visual and physical obstructions and so as to be more comfortable in the event of operator contact. Ergonomically shaped and otherwise smoothly contoured assemblies are also highly desirable and attractive to consumers who, in general, find a modern, sleek and sophisticated appearance to be highly desirable.

It is an object of the invention to provide a versatile lathe that addresses the deficiencies of the conventional lathes noted above.

It is conventional to provide a tool rest that slidably engages a bedway and is selectively cam locked in position. Such conventional cam locks typically include an eccentric shaft received in the cylindrical bore of a piston disposed in the housing of the tool rest and a clamping plate provided below the bedway for being clamped against the bedway when the cam shaft is rotated. Such locking assemblies define clamping pressure at the locus of the locking plate and at the longitudinal ends of the eccentric shaft. This can lead to bowing of the cam shaft and the potential for an incomplete clamping of the tool rest to the bedway.

Thus, it is a further object of the invention to provide a locking assembly for locking components, such as a tool rest, to a bedway in a manner that eliminates shaft-flex.

Accordingly, the tool rest provided in accordance with a presently preferred embodiment of the invention has a unique sliding piston locking system that eliminates shaft-flex, thereby ensuring a creep-free positive lockdown, even under the heavy impacts of large diameter outboard turning.

Accordingly, in a first aspect of the invention, a lathe assembly is provided that comprises: a base unit having first and second longitudinal ends; a headstock assembly comprising a housing and a spindle shaft assembly extending therethrough and rotatably mounted thereto, the spindle shaft having a longitudinal axis; a first bedway defined on the base unit for selectively receiving at least one of a tailstock and a tool rest assembly, the first bedway generally extending from the headstock assembly toward the second end of the base unit, the first bedway having a longitudinal axis parallel to the longitudinal axis of the spindle; a shaft locking assembly secured to the spindle shaft for selectively locking the spindle shaft with respect to the housing at 90 degree intervals; and an indexing assembly for angularly positioning and holding the spindle shaft with respect to the housing at any one of a plurality of intervals intermediate the 90 degree intervals of the shaft locking assembly, the indexing assembly including an indexing component fixedly secured to the spindle shaft and an indexing pin mounted to the housing of the headstock assembly.

According to another aspect of the invention, a lathe assembly is provided that comprises: a base unit having first and second longitudinal ends, a headstock assembly provided adjacent the first longitudinal end of the base unit, the headstock assembly including a spindle housing having a spindle shaft extending therethrough, a first lathe bed assembly provided on the base unit and including a bedway extending longitudinally in a direction parallel to the longitudinal axis of the spindle for slidably receiving at least one of a tool rest and a tailstock; and a second lathe bed assembly detachably coupled to at least one of the first and second longitudinal ends of the base unit, the second bed assembly including a second bedway for selectively receiving at least one of a tailstock and a tool rest assembly.

According to yet another aspect of the invention, a lathe assembly is provided that comprises: a first base unit having first and second longitudinal ends and including a first lathe bed assembly having first and second longitudinal ends and a first bedway defined therein for slidably receiving at least one of a tool rest assembly and a tailstock assembly; a headstock assembly mounted to the base unit, the headstock assembly including a spindle housing portion having a spindle shaft rotatably disposed therein; a first tailstock assembly selectively slidably disposed in the first bedway, the first tailstock assembly including a quill housing portion having a quill assembly rotatably disposed therein and axially aligned with the spindle shaft of the headstock assembly; and a locking assembly for selectively locking the first tailstock assembly to the first bedway, wherein at least one of the quill housing portion of the first tailstock assembly and the spindle housing portion of the headstock assembly is generally elliptically shaped in longitudinal section and generally circularly shaped in transverse cross section so as to define a generally continuously curved outer peripheral surface.

According to yet another aspect of the invention, a tool rest assembly for a lathe apparatus having a lathe bed assembly is provided, the tool rest assembly comprising a tool support housing extending vertically from a tool rest main body, the tool rest main body comprising a tool rest housing and a locking assembly for selectively locking the tool rest housing to the lathe bed assembly, the locking assembly including a locking plate for engaging an undersurface of a bedway of the lathe bed assembly; a slider block seated and disposed within the tool rest housing, a non-circular locking shaft extending longitudinally of the housing and disposed through a bore in the slider block, and a locking piston vertically slidably disposed in the slider block, the locking piston having a bore for being aligned with the bore of the slider block to receiving the locking shaft and having a shaft for being detachably mounted to the locking plate, whereby rotation of the locking shaft about the longitudinal axis thereof lifts the locking piston and the locking plate mounted thereto while pressing the block so as to clamp the housing to a bedway between the slider block and the locking plate.

BRIEF DESCRIPTION OF THE DRAWINGS

These, as well as other objects and advantages of this invention, will be more completely understood and appreciated by careful study of the following more detailed description of the presently preferred exemplary embodiments of the invention taken in conjunction with the accompanying drawings, in which:

FIG. 4 is a left end view of the headstock assembly shown in FIG. 1;

FIG. 5 is a schematic cross-sectional view taken along lines 5—5 of FIG. 4;

FIG. 9 is a schematic view, partly in cross-section, of an indexing pin mounted to the spindle housing of the headstock assembly in its disengaged position with respect to the indexing component;

FIG. 10 is a schematic view, partly in cross-section, of the indexing pin and the indexing component showing the pin in the engaged position;

FIG. 11 is a plan view of the indexing pin receptacle of the spindle housing with the remainder of the spindle housing omitted for clarity, FIG. 12 is a cross-sectional view taken along lines 12—12 of FIG. 11, and rotated 90° counterclockwise for clarity;

DETAILED DESCRIPTION OF THE INVENTION

Figure 1:
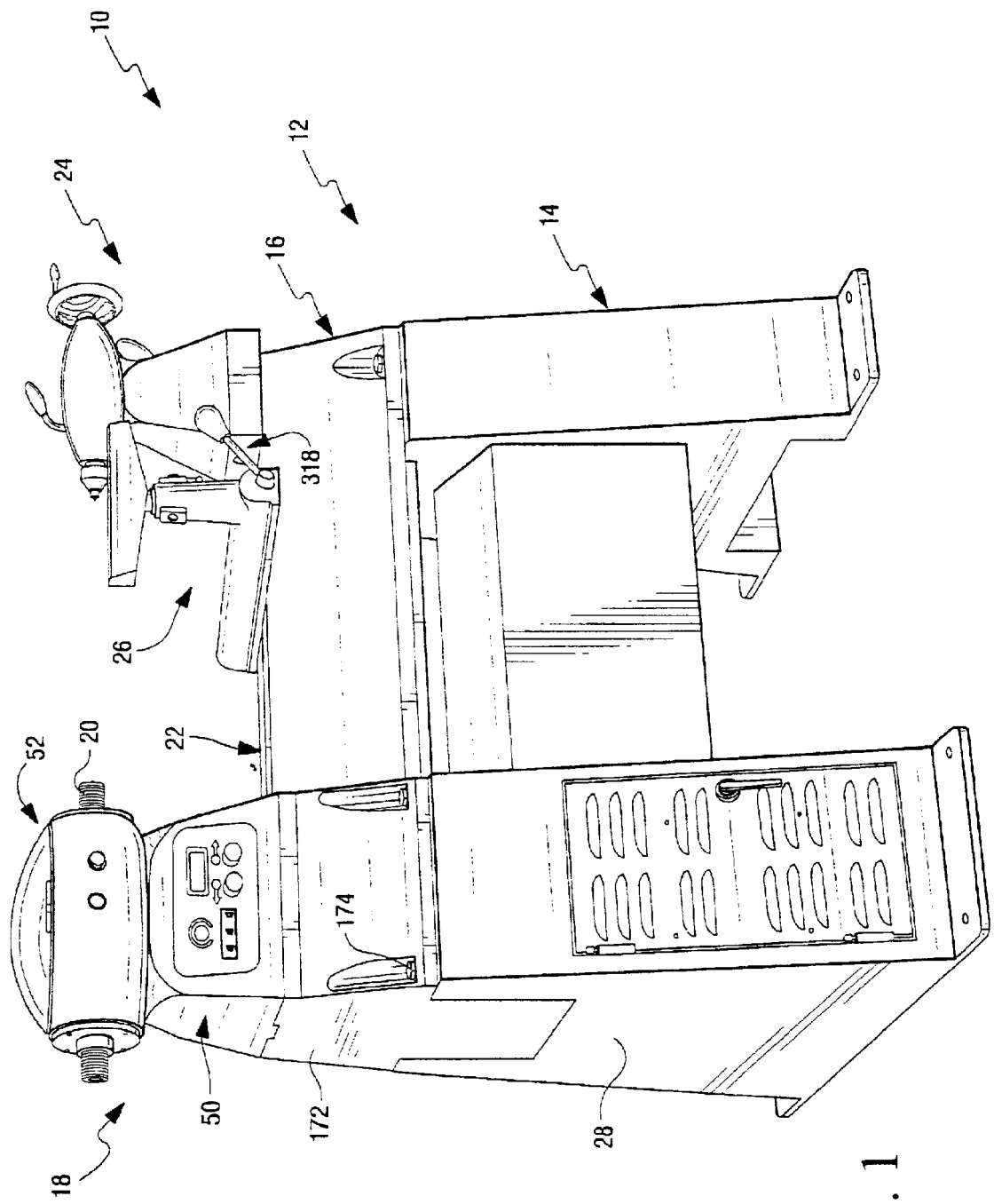
FIG. 1 is a perspective view from the front, left and above of a lathe embodying the invention.
Figure 25:
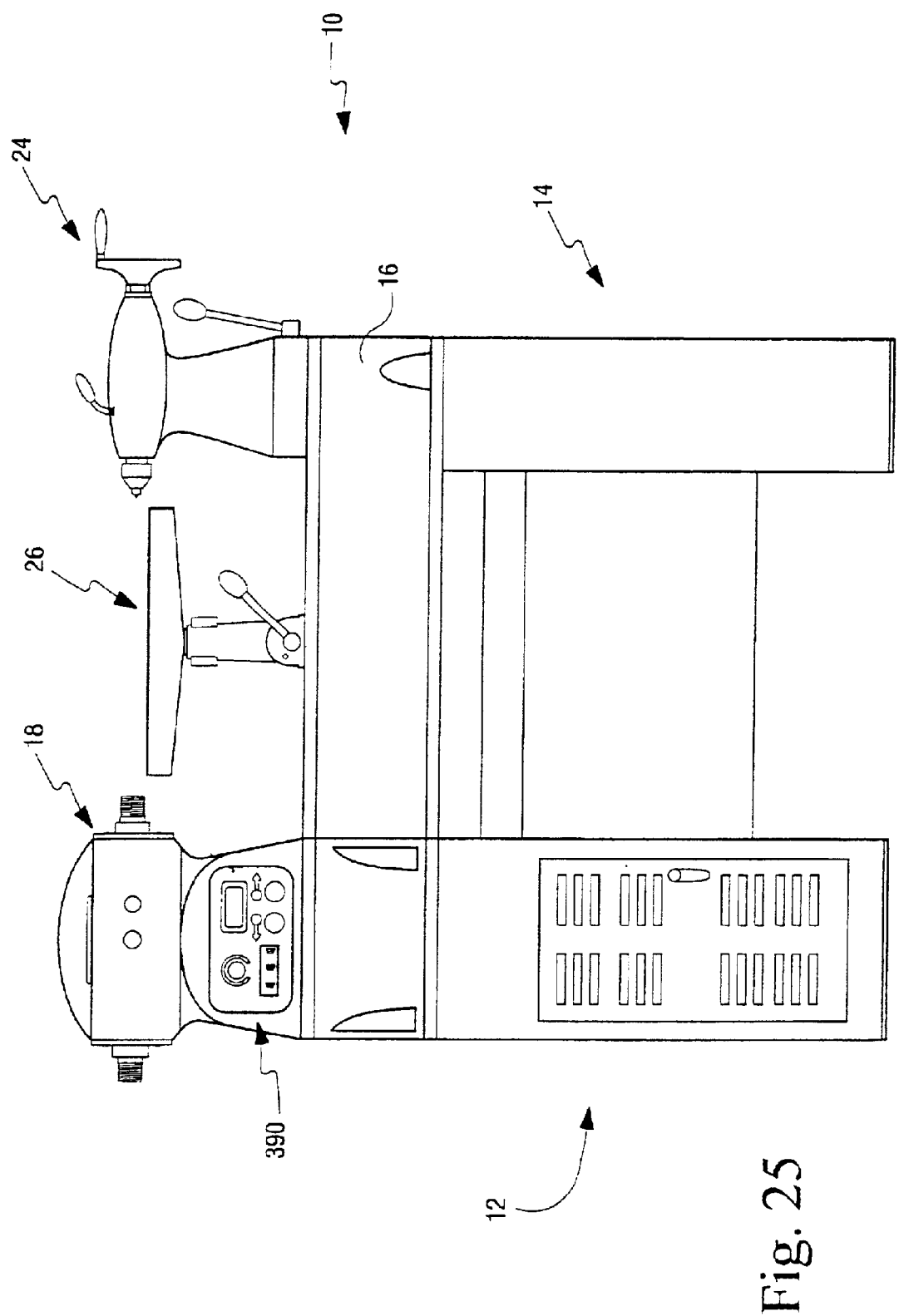
FIG. 25 is a front elevational view of a basic lathe assembly according to the invention.

A basic lathe assembly embodying the invention is illustrated in FIGS. 1 and 25. As will be apparent below, a bed extension and/or outboard or inboard beds may be mounted to the basic lathe, as can inboard and outboard tool rests and inboard and outboard tailstocks as illustrated in FIGS. 26–29, to accommodate a wide variety of blank sizes and shapes including particularly long blanks such as for a decorative column or particularly wide workpieces such as a bowl.

The components of the basic lathe assembly, illustrated in FIGS. 1 and 25, will now be described in greater detail.

The basic lathe assembly 10 includes a base unit 12 that includes a lathe cabinet assembly 14 and a lathe bed 16. A headstock assembly 18 is mounted to one longitudinal end of the base unit 12 and includes a spindle 20 for engaging and rotating a workpiece (not shown). The lathe bed 16 includes a bedway 22 for selectively slidably receiving a tailstock assembly 24 and/or an inboard tool rest.

Figure 2:
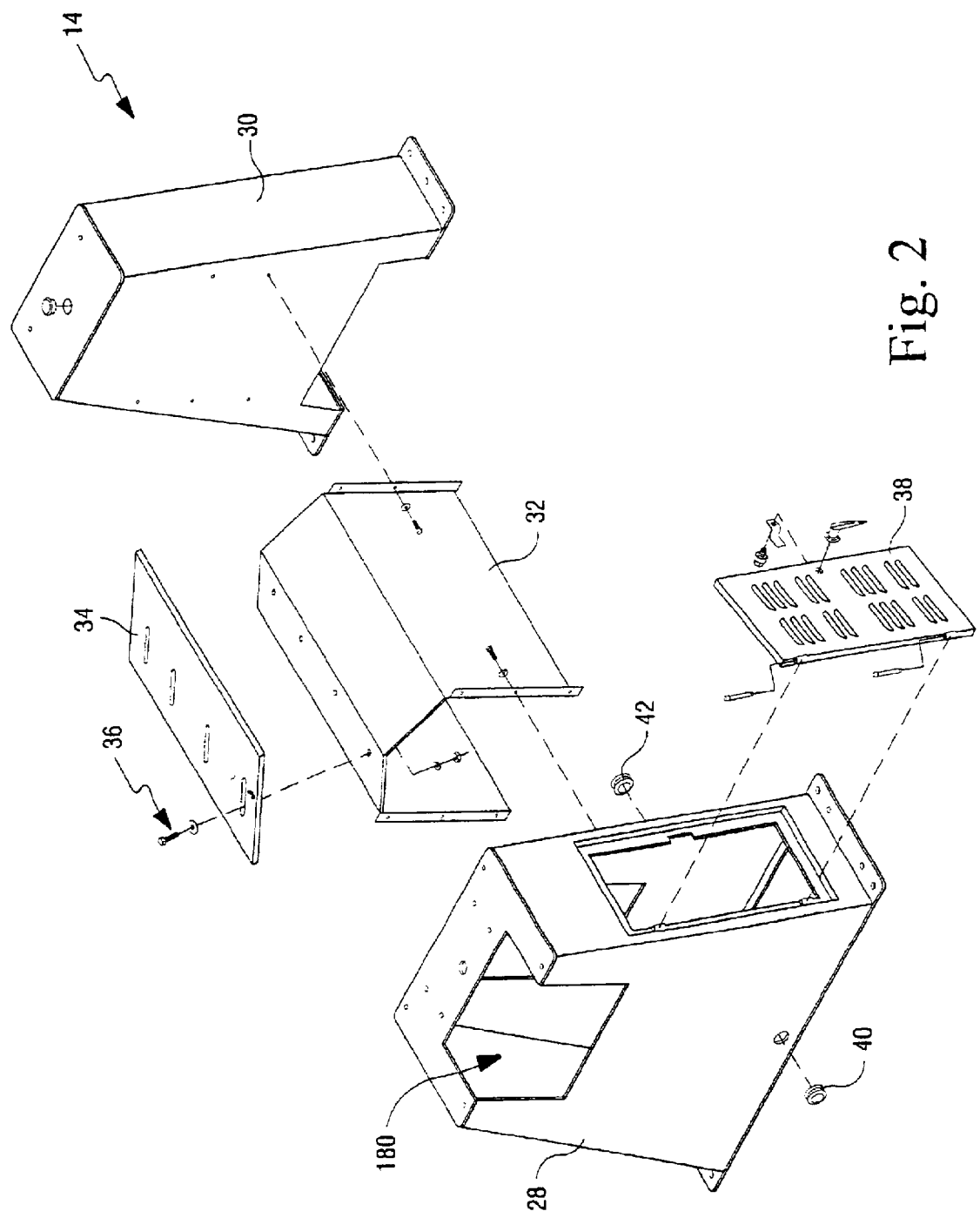
FIG. 2 is an exploded perspective view of a lathe cabinet assembly according to the embodiment of FIG. 1.

As noted, the basic lathe assembly 10 includes a base unit 12 having a lathe bed assembly 16. The bed assembly 16 is supported by the lathe cabinet assembly 14 which is illustrated in the exploded view of FIG. 2. At one longitudinal end of the cabinet assembly, a motor cabinet 28 is provided for being disposed vertically below the headstock assembly 18. The shaft of a motor (not shown) extends into the motor cabinet 28 for driving a belt (not shown) operatively coupled to the headstock assembly spindle 20 as described in greater detail below. In the illustrated embodiment, the motor is disposed generally longitudinally centrally of the cabinet assembly 14, between the motor cabinet 28 and inboard bed support 30. To shield the motor from dust and debris and to interconnect the motor cabinet and inboard support bed, a motor shroud 32 is secured to and extends between the motor cabinet 28 in the inboard bed support 30. In the illustrated embodiment, a dust deflector 34 is secured as by bolts 36 to the motor shroud 32 to further shield the motor assembly from debris chipped from the workpiece. In the illustrated embodiment, a motor cabinet door 38 is mounted to the motor cabinet 28 to provide access to the pulley of the motor, in particular for adjusting the belt driven thereby. Further, in the illustrated embodiment, the rubber bushings 40 are inserted through holes in the motor cabinet for accommodating the power cord for the unit and the cable for a remote control on/off switch, as described in greater detail below.

Figure 3:
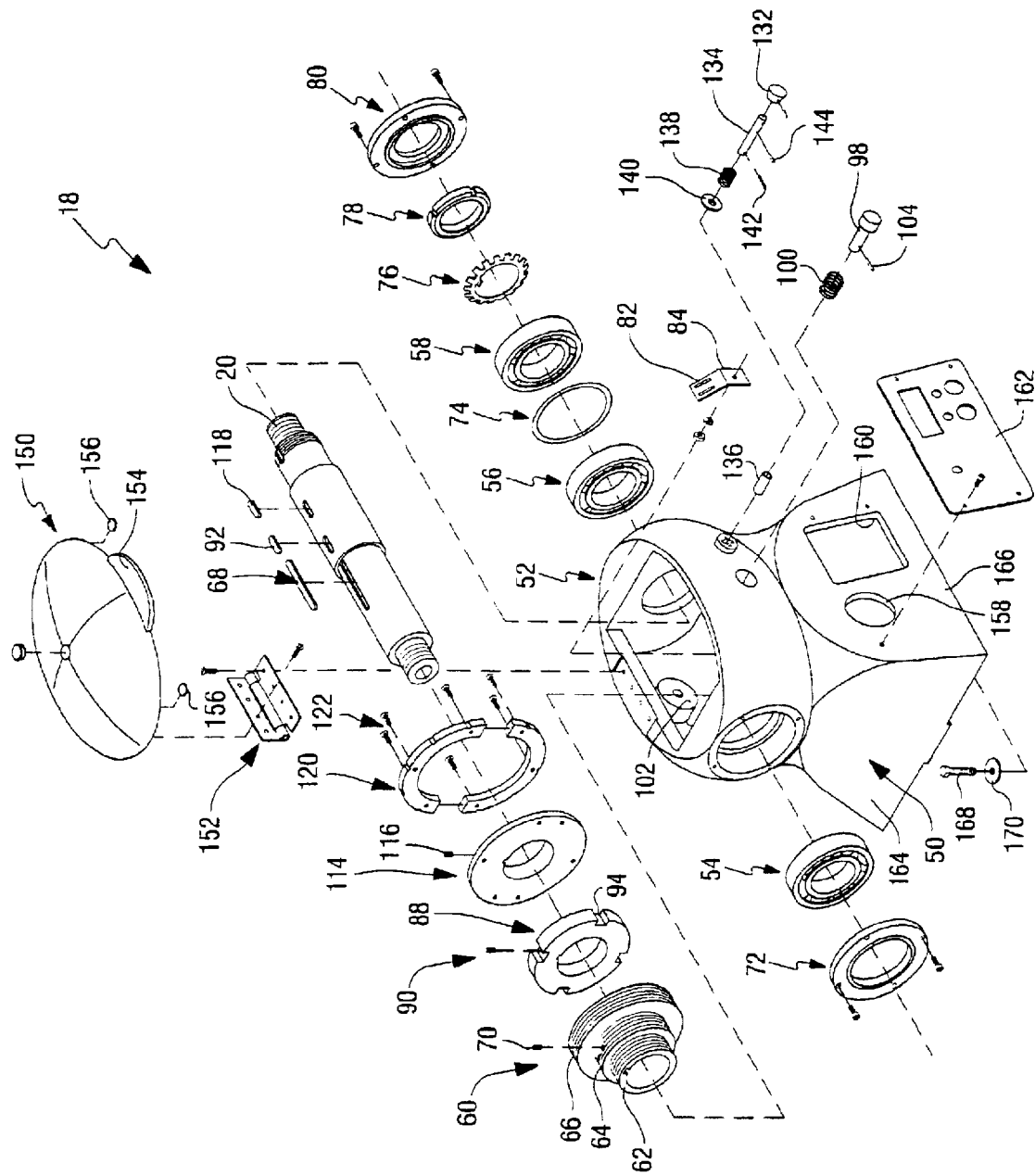
FIG. 3 is an exploded perspective view of a headstock assembly embodying the invention.

The headstock assembly 18 according to an embodiment of the invention is illustrated in the exploded view of FIG. 3. The headstock assembly includes a control housing portion 50 and a spindle housing portion 52. The spindle housing portion 52 of the headstock assembly 18 is generally elliptically shaped in longitudinal section, as shown in FIG. 5, and generally circular shaped in transverse cross-section, as shown in FIG. 4. As a result, as illustrated in FIGS. 3 and 5, the spindle housing 52 has a generally continuously curved outer surface which minimizes obstruction of view of the workpiece, provides a comfortable surface should the operator lean against or bump against the headstock assembly 18, and presents an overall sleek and modern looking appearance, making the product ascetically pleasing to the consumer.

Spindle shaft 20 is rotatably mounted by a suitable bearings 54, 56, 58 to the spindle housing as illustrated in FIG. 5. In the presently preferred embodiment, the massive spindle shaft is 2½" in diameter and 16" long with a ⅝" through hole. It has right-hand 1½"–8 threads, #2 morse tapers and two rows of bearings 54, and 56, 58 on both ends. The spindle shaft has an indexing assembly 110 and a shaft locking assembly 86. As described in greater detail below, in the illustrated embodiment, the indexing ring of the indexing assembly is a 48 point indexing ring, although other ring configurations may be optionally provided. Furthermore, in the illustrated embodiment, the shaft locking assembly 86 is a four-point, two-position, spring-loaded shaft locking mechanism.

Fixedly secured to the spindle shaft 20 is a shaft pulley 60 for translating rotation of the motor shaft to rotation of the spindle. As illustrated, the shaft pulley includes three segments 62, 64, 66 for defining three speed ranges for the lathe, 0 to 600 rpm for a large bowl turning, 0 to 1200 rpm for standard bowl turning and 0 to 2000 rpm for high speed bowl turning and finishing, respectively. In the illustrated embodiment, the spindle shaft pulley is secured to the spindle shaft with a square key 68 and set screw 70.

The spindle shaft 20 is mounted to the spindle housing 52 of the headstock assembly at one longitudinal end by one outboard bearing cover 72. At the inboard end, two inboard bearings 56, 58 are provided in the illustrated embodiment with an inboard spindle bearing shim 74 disposed therebetween. Further, a spindle nut lock washer 76 and spindle nut 78 are disposed between the inboard bearings 56, 58 and the inboard bearing cover 80. As schematically illustrated, a sensor 82 provided on a sensor bracket 84 is mounted within the spindle housing 52 for monitoring the rotation of the spindle 20 so that the revolutions per minute of the spindle can be determined.

A temporary shaft locking assembly 86 is further incorporated in the headstock assembly 18. In the illustrated embodiment, a shaft locking disk 88 is secured with respect to the spindle shaft assembly by a shaft locking disk set screw 90 which engages a shaft locking disk square key 92, as best illustrated in FIG. 5. Four locking points are defined by recesses 94 provided at 90 degree intervals about the outer peripheral edge of the shaft locking disk 88. A shaft locking pin assembly 96 is mounted to diametrically opposite sides of the spindle housing 52. As illustrated in FIG. 5, each shaft locking pin assembly 96 includes a locking pin 98 having a spring 100 coaxially mounted thereto and received in a respective locking pin housing 102 defined in the wall of the spindle shaft housing 52. A cotter pin 104 is inserted through a bore defined in each locking pin 98 to preclude its ejection radially out from the house due to the spring force of spring 100. The shaft locking assembly 86 is used for locking the spindle shaft 20 when installing or removing a jawed chuck (not shown) to or from the spindle shaft. It is a positive lock strong enough to hold the shaft from rotating. However, in the illustrated embodiment, because the locking pins 98 are spring loaded by springs 100, the user must hold the pin(s) 98 in the engaged position, that is engaged with recess(es) 94. This minimizes the chance of the lathe being turned on while the pins are engaged with recesses 94.

Figure 8:
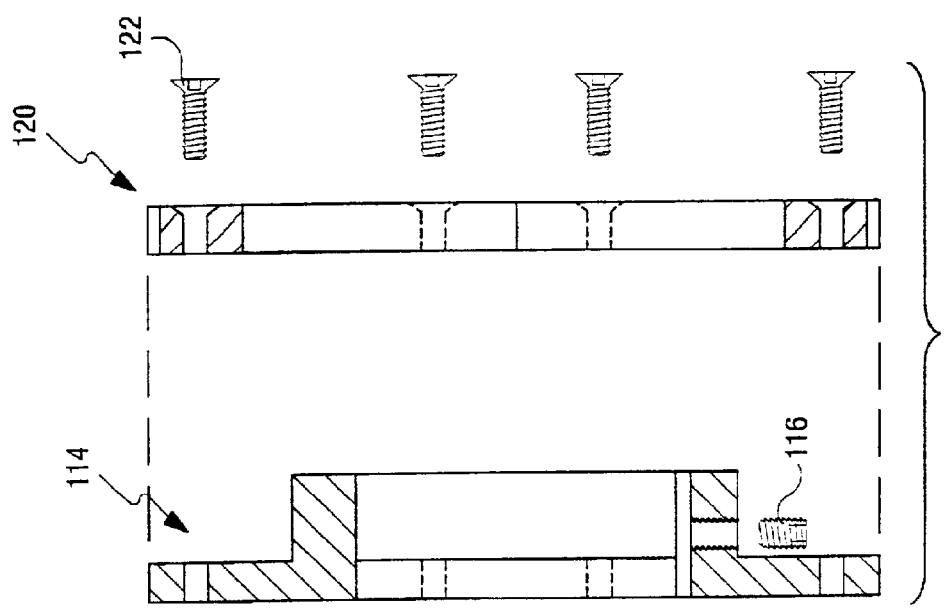
FIG. 8 is an exploded cross-sectional view illustrating the assembly of the indexing ring to the indexing disk to define the indexing component of the indexing assembly of the invention.
Figure 6:
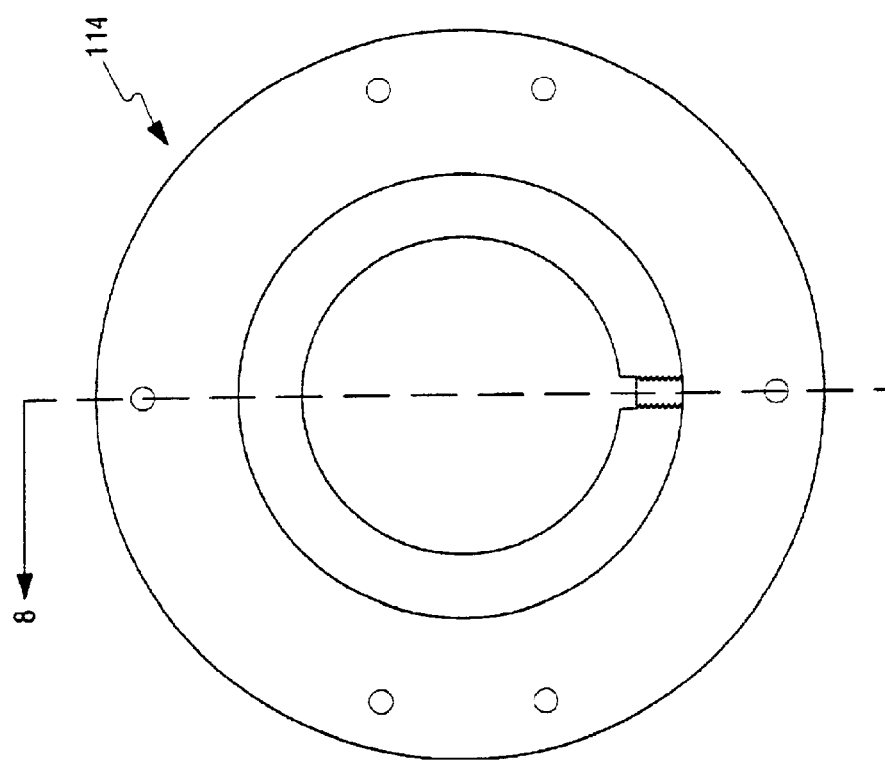
FIG. 6 is an elevational view of an indexing disk of an indexing assembly according to the invention.
Figure 7:
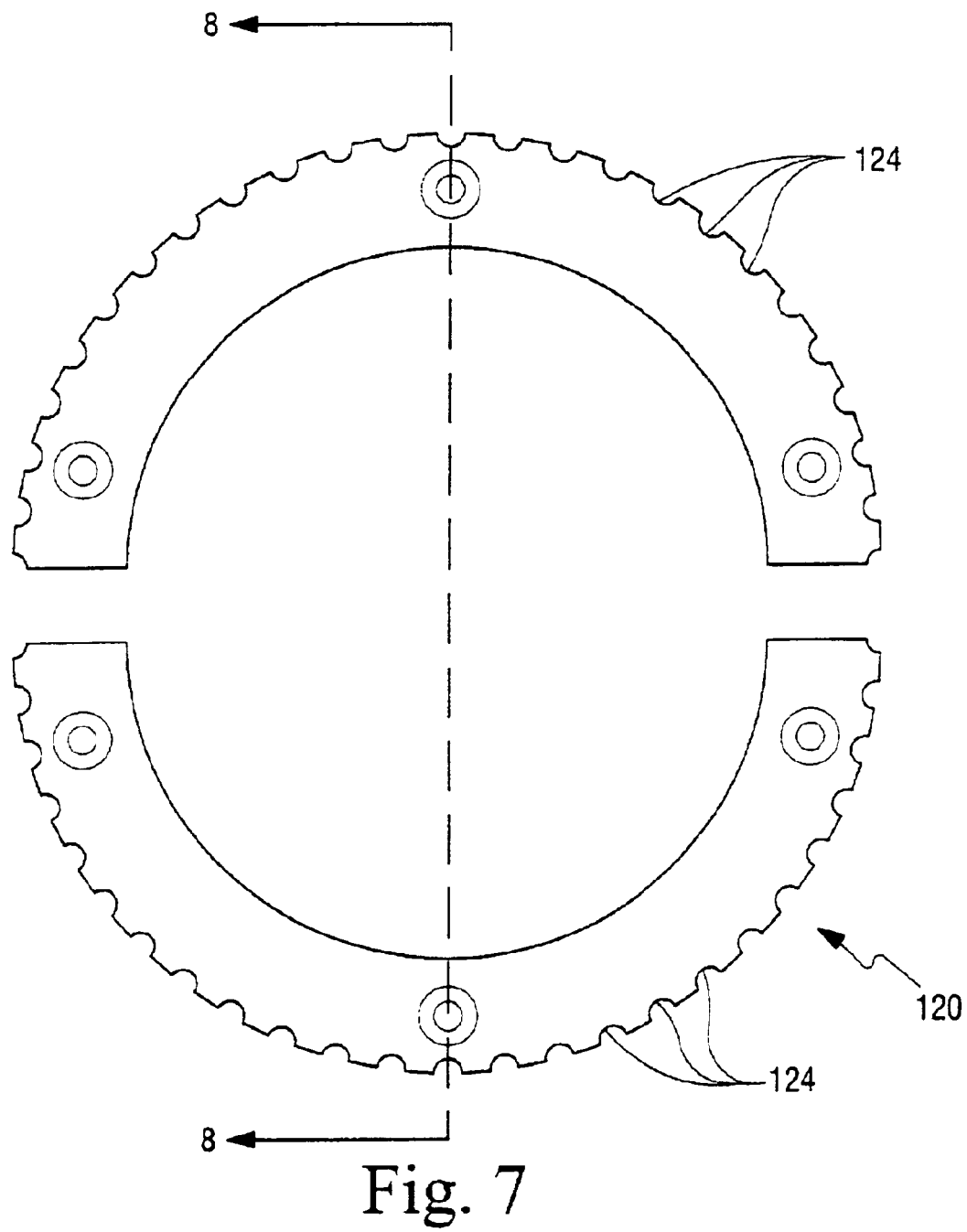
FIG. 7 is an exploded elevational view of an indexing ring of the indexing assembly of the invention.

An indexing assembly 110 is also incorporated in the headstock assembly 18. The indexing assembly 110 includes an indexing component 112 fixedly secured to the spindle shaft 20. In the illustrated embodiment, as best shown in FIGS. 6–8, the indexing component 112 includes an indexing disk 114 for being lockingly engaged with the spindle shaft 20 assembly via set screw 116 and square key 118, as best shown in FIG. 5. The indexing component 112 further includes an indexing ring 120 that is fixedly secured to the indexing disk 114. In the illustrated embodiment, the indexing ring 120 is formed in two halves which are each secured by suitable screws 122 to the indexing disk 114. As illustrated, a plurality of indexing pin receptacles 124 are defined about the outer periphery of the indexing ring. The receptacles are preferably uniformly distributed about the periphery of the ring and may number from e.g. about 12 to 48. In one exemplary embodiment, as shown in FIG. 7, the indexing ring is a 48 point indexing ring although fewer indexing points may be provided as schematically illustrated in FIG. 3. As noted, recesses 124 are defined about the outer periphery of the indexing ring to define indexing points. In the illustrated embodiment, the receptacles each are generally semi-circular for receiving an engaging tip of an indexing pin 126, as described herein below.

Turning to FIGS. 9–12, an indexing pin housing 128 is defined in the spindle housing wall 130 for slidably receiving indexing pin 126. In the illustrated embodiment, the indexing pin includes an indexing pin knob 132, an indexing pin shaft 134, an indexing pin sleeve 136, which may be for example formed from a metal material such as bronze, an indexing pin spring 138 for urging the pin inwardly of the spindle housing, an indexing pin washer 140, and an indexing pin cotter pin 142. Thus, the indexing pin spring engages the pin sleeve 136/housing 128 at one longitudinal end thereof and the indexing pin washer at the other end thereof. The cotter pin 142 precludes longitudinal displacement of the indexing pin washer 140 so that the indexing pin 126 tends to be displaced radially inwardly of the spindle housing under the influence of the indexing pin spring. An indexing pin locking dowel pin 144 is further provided, however, to selectively limit the displacement of the indexing pin 126 inwardly of the housing.

As shown in FIGS. 11 and 12, the indexing pin housing 128 includes first and second pairs of diametrically opposed grooves 146, 148. The first grooves 146, which in the illustrated embodiment are provided at the 12 o'clock and 6 o'clock positions, are relatively deep, tracking grooves for defining the engaged position of the dowel pin shown in FIG. 10. The grooves or slots defined at the 3 o'clock and 9 o'clock positions are of limited depth for receiving the dowel pin 144 to define the disengaged position of the indexing pin illustrated in FIG. 9. Thus, by pulling the indexing pin radially outwardly of the spindle housing and rotating the indexing pin 90 degrees and then allowing the indexing pin to be displaced radially inwardly under the influence of the indexing pin spring 138, the operator can selectively engage (or disengage) the indexing component 112 with the indexing pin 126. The indexing assembly 110 thus allows the spindle shaft and thus the workpiece secured thereto to be selectively indexed to any one of a plurality of angular positions.

The indexing assembly 110 is used for locating desirable positions around the circumference of the workpiece. This is to be used, for example, for holding the workpiece during carving, fretwork, inlays, and the like. As noted above, indexing rings 114 may be provided in various degree steps with, for example, 12 to 48 steps presently contemplated. It is to be noted that in the absence of a mechanism for holding the spindle shaft, such as provided by the indexing assembly 110, the workpiece may undesirably rotate from a desired inspection or working position.

Returning now to FIG. 3, it can be seen that the top portion of the spindle housing portion 52 of the headstock assembly 18 defines a headstock cover 150 which may be selectively displaced to access the interior of the spindle housing portion 52, for example, for adjusting the drive belt and/or for determining the shaft pulley portion for engaging the same. In the illustrated embodiment, the headstock cover 150 is hingedly secured with hinge 152 to the remainder of the spindle housing 52 and a handle flange 154 is provided for selectively lifting the headstock cover. Advantageously, headstock cover bumpers 156 are provided so that the cover will not rattle during operation of the lathe.

As noted above, headstock assembly 18 includes not only the spindle housing portion 52, but also a control unit housing portion 50. In the illustrated embodiment, apertures 158, 160 are defined in the control unit housing portion for control system display units. However, a cover plate 162 is secured to the control housing portion to provide smaller openings through which various indicators are displayed. The cover plate may also receive indicia, manufacturer logo information and the like. To define a transition to the base unit 12 of the lathe 10, the control unit housing portion 50 includes four generally planar faces, two of which 164, 166 are shown in FIG. 3, to transition from the curved spindle housing 52 to the generally rectilinear base unit 12. The headstock assembly 18 is secured to the base unit in the presently proposed embodiment, by headstock bolts 168 which are shown with their associated washers 170 for securing the headstock casting 50, 52 to the base unit 12.

Figure 13:
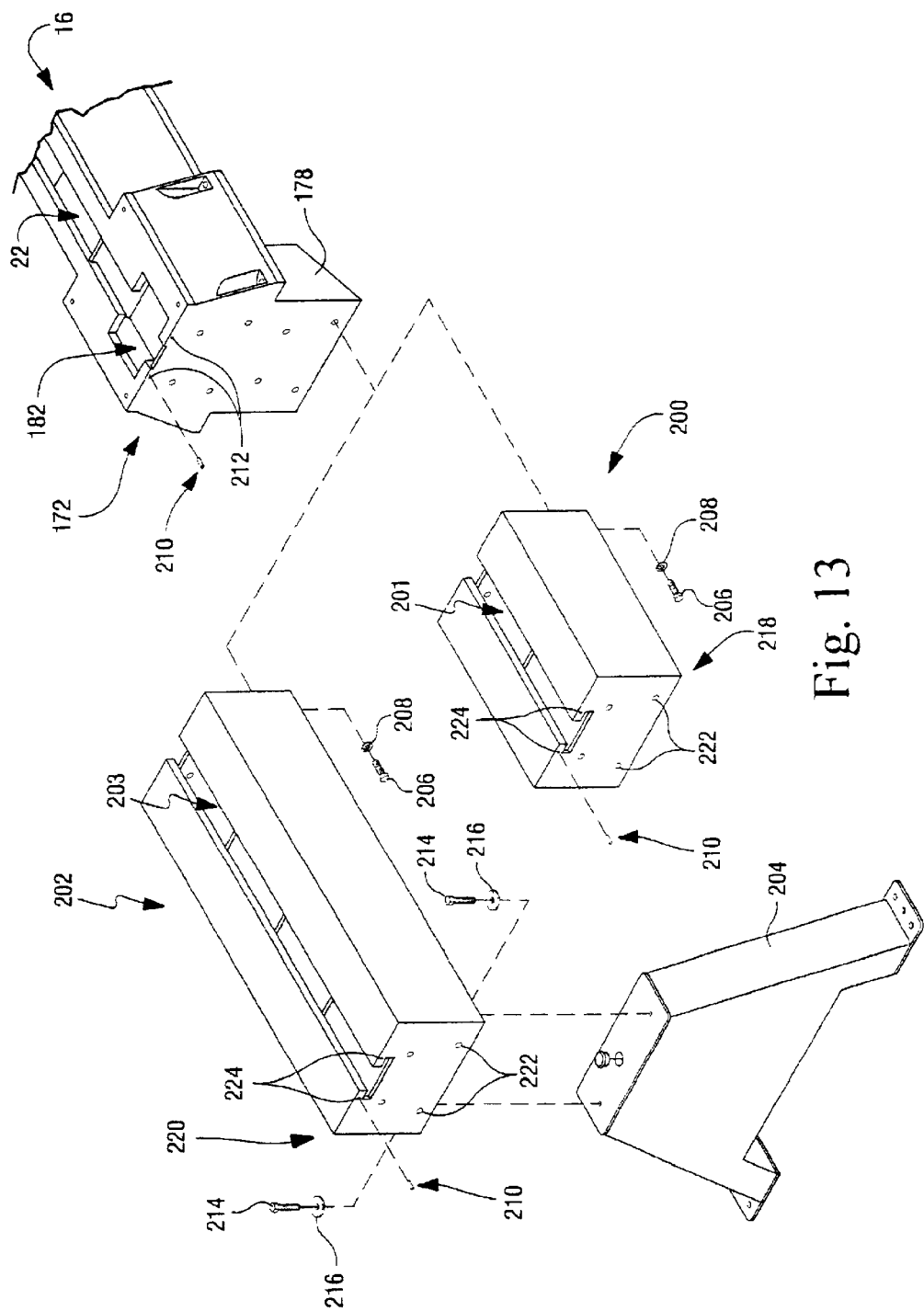
FIG. 13 is an exploded perspective view illustrating the selective mounting of outboard bed assemblies to the lathe bed in an embodiment of the invention.
Figure 14:
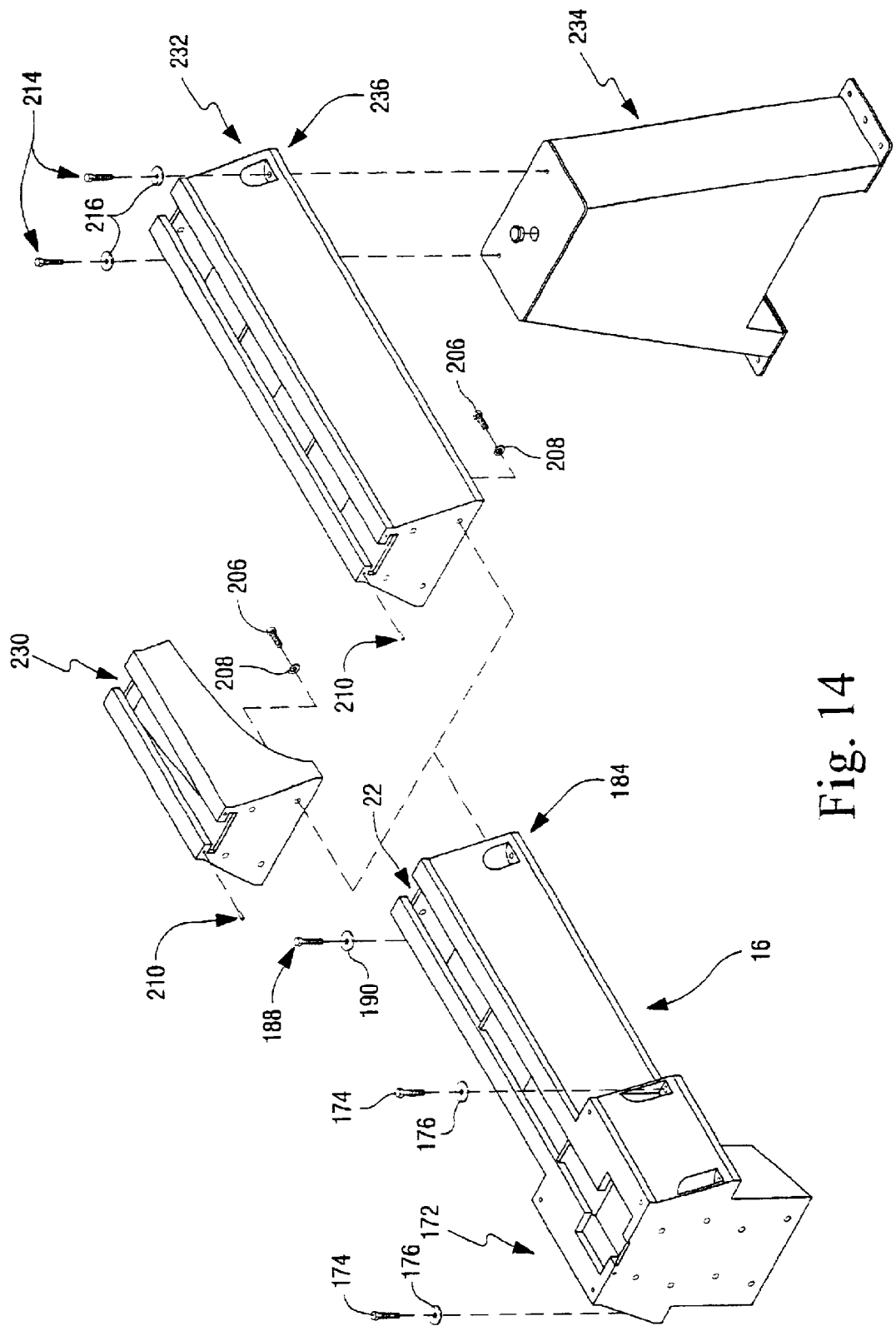
FIG. 14 is an exploded perspective view illustrating the selective mounting of inboard bed assemblies to the lathe bed in an embodiment of the invention.
Figure 27:
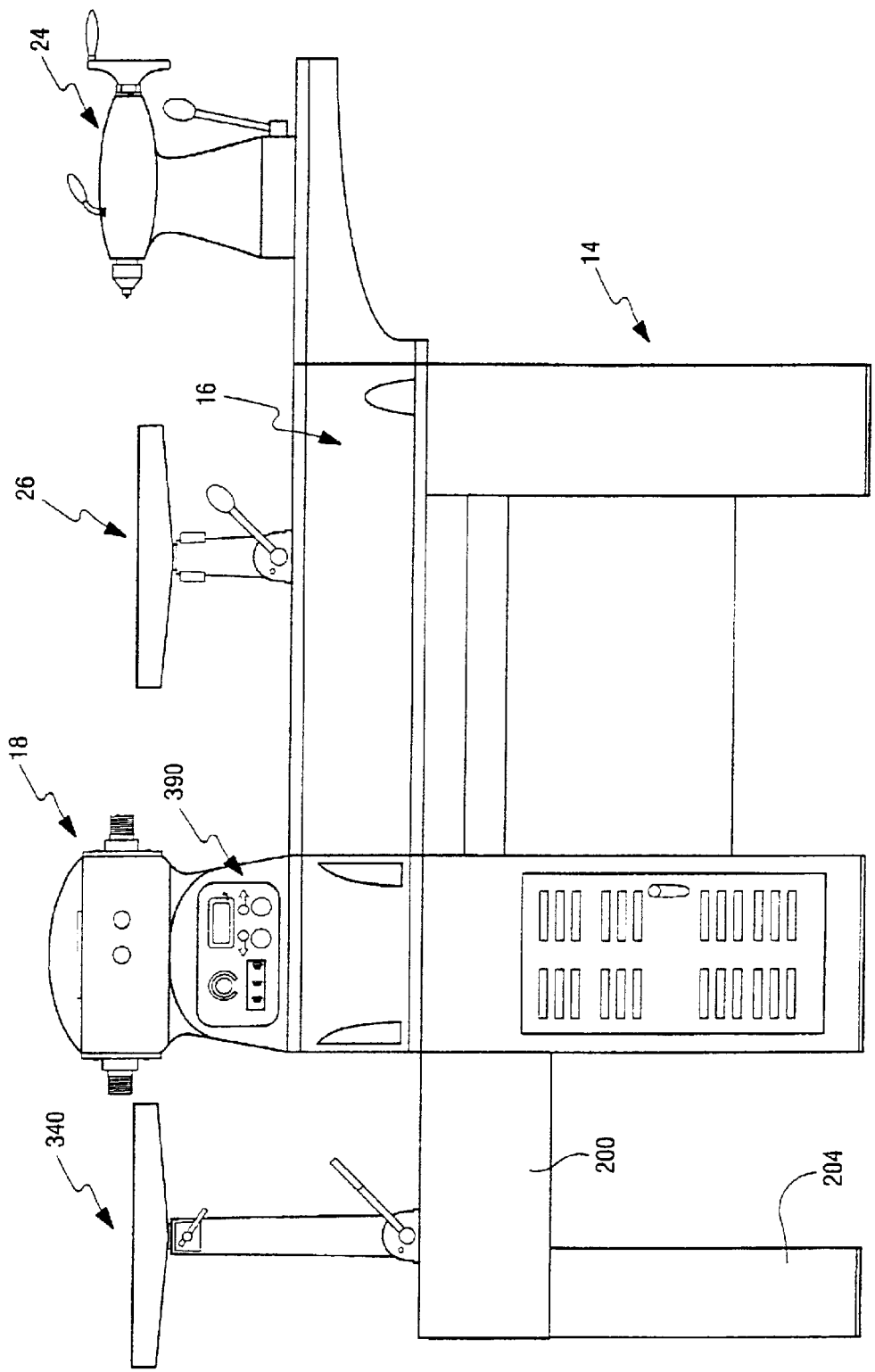
Figure 28:
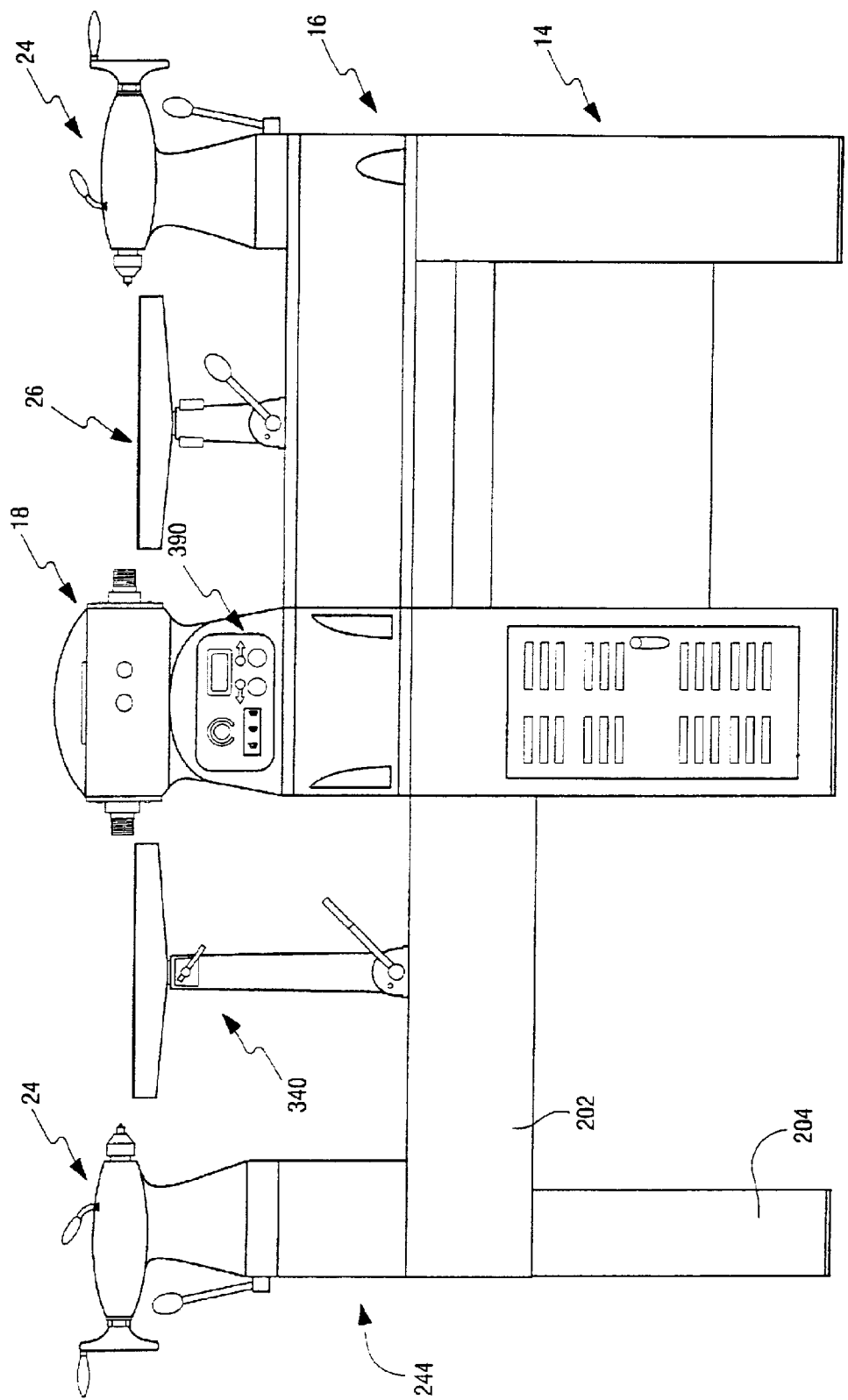

As illustrated in FIGS. 1, 13 and 14, a lathe bed 16 is provided in accordance with the invention. With reference to FIGS. 1, 13, 14, and 25, one end 172 of the lathe bed receives the headstock casting 50, 52 thereon and is itself secured by suitable bolts 174, shown with their respective washers 176, to the motor cabinet 28. A belt sleeve 178 projects downwardly at the one end 172 of the lathe bed for being received in a corresponding receptacle 180 defined in the motor cabinet 28. As will be understood, the drive belt (not shown) extends from the motor cabinet 28, through the drive belt sleeve 178 of the lathe bed and through the drive belt opening 182 defined in the upper surface thereof, and into the headstock assembly 18 for engagement with the shaft pulley 60. The other longitudinal end 184 of the lathe bed is adapted to be selectively mounted to the inboard bed support 30, shown in FIG. 2, by suitable bolts 188 and associated washers 190. The first end 172 of the lathe bed 16 may remain free from attachment to any accessory product and thus can define a configuration as illustrated, for example, in FIG. 25 at the first end of the lathe assembly. In the alternative, an outboard bed assembly may be secured to the first end of the lathe bed. In the exploded perspective view of FIG. 13, first and second optional outboard beds 200, 202 are illustrated as is outboard bed support 204. As illustrated in FIGS. 27 and 28, the provision of an outboard bed allows a workpiece of greater diameter to be turned than the inboard bed lathe 16.

Referring again to FIG. 13, in the illustrated embodiment, an 18 inch outboard bed 200 is illustrated as is a 36 inch outboard bed 202. The 18 inch outboard bed 200 includes a bedway 201 for selectively receiving e.g. a tool rest, or even a tailstock assembly for the turning a short workpieces such as platters or bowls. The 36 inch outboard bed 202 also defines a bedway 203 complimentary to an outboard tool rest 340, described in greater detail below, and/or a tailstock assembly 24/244 as illustrated in FIG. 28. To provide the assembly illustrated in FIG. 27, the 18 inch outboard bed 200 is secured by bed bolts 206 and bed washers 208 to the first longitudinal end of the lathe bed 172. Bed alignment pins 210 are desirably provided and received in alignment pin receptacles 212 of the first end of the lathe bed. The first end 218 of outboard bed 200 may then be bolted to the outboard bed support 204 by a suitable support bolts 214 and washers 216 to produce the configuration shown in FIG. 27. In the alternative, the 36 inch outboard bed 202 illustrated in FIG. 13 may be secured via bed bolts 206 to the first end 172 of the lathe bed 16 and aligned by alignment pins 210 as noted above. The first end 220 of the outboard bed 202 is likewise secured to the outboard bed support 204 by a support bolts 214. As illustrated, the first longitudinal end 218 of the 18 inch outboard bed 200 and the first longitudinal end 220 of the 36 inch outboard bed 202 each has outboard bolt receptacle holes 222 and alignment pin holes 224 defined therein so that further bed assemblies may be longitudinally secured thereto to provide a variety of lathe bed options for various outboard assemblies, the various tool rest and tailstock assemblies (described below) all being selectively interchangeably mounted as deemed necessary or desirable to accommodate the particular workpiece to be worked on the lathe.

Figure 29:
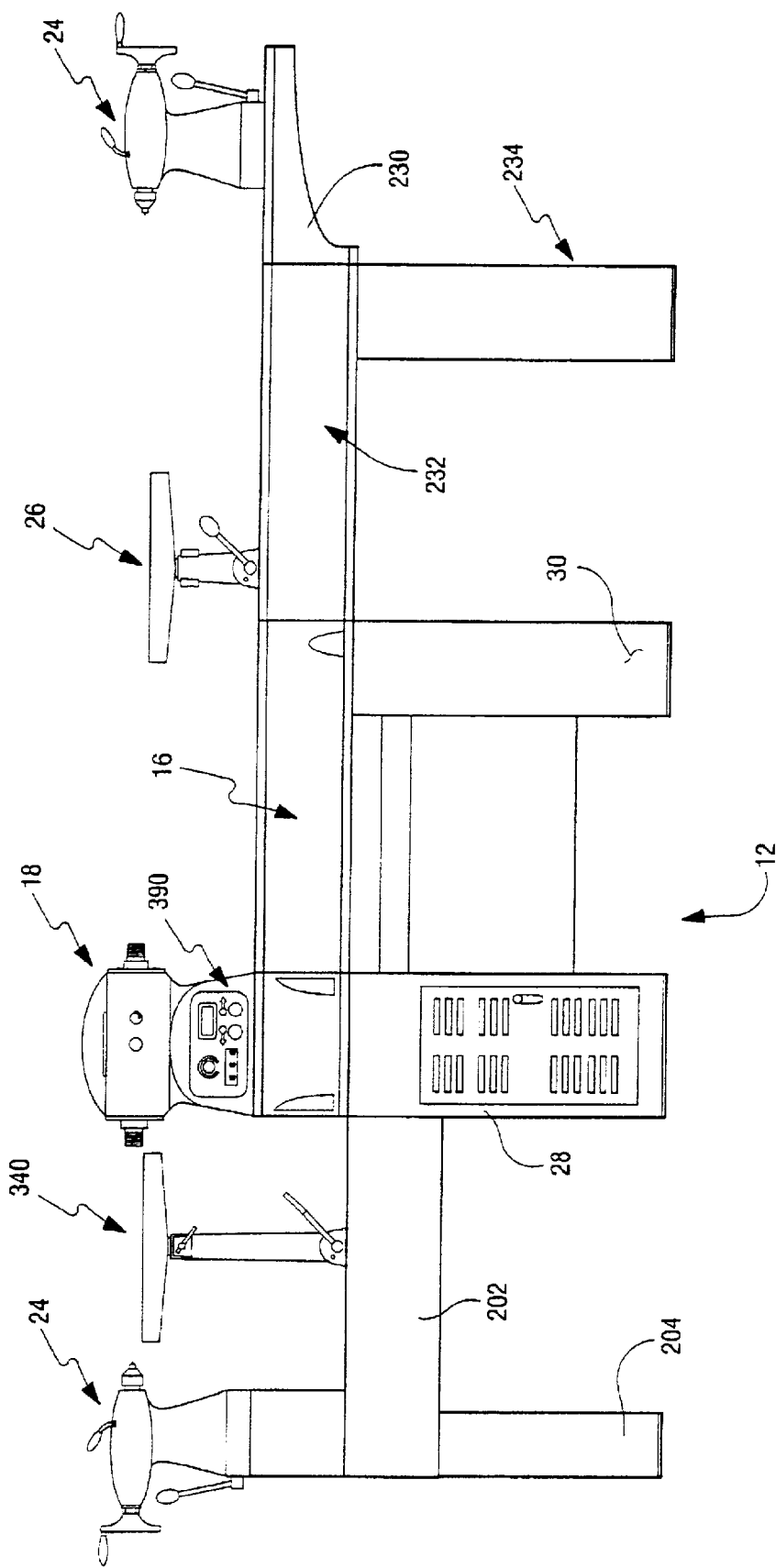

Returning to FIG. 14, and as mentioned above, lathe bed 16 includes a bedway 22 defining a receptacle for selectively mounting a tool rest 26 and/or a tailstock assembly 24 as illustrated in FIGS. 25, 27 and 28. For particularly long workpieces, the lathe bedway may be free from such accessory structures as illustrated in FIG. 29 but is to be understood that the tool rest may be variously disposed in the lathe bedway for working the long workpiece.

Figure 26:
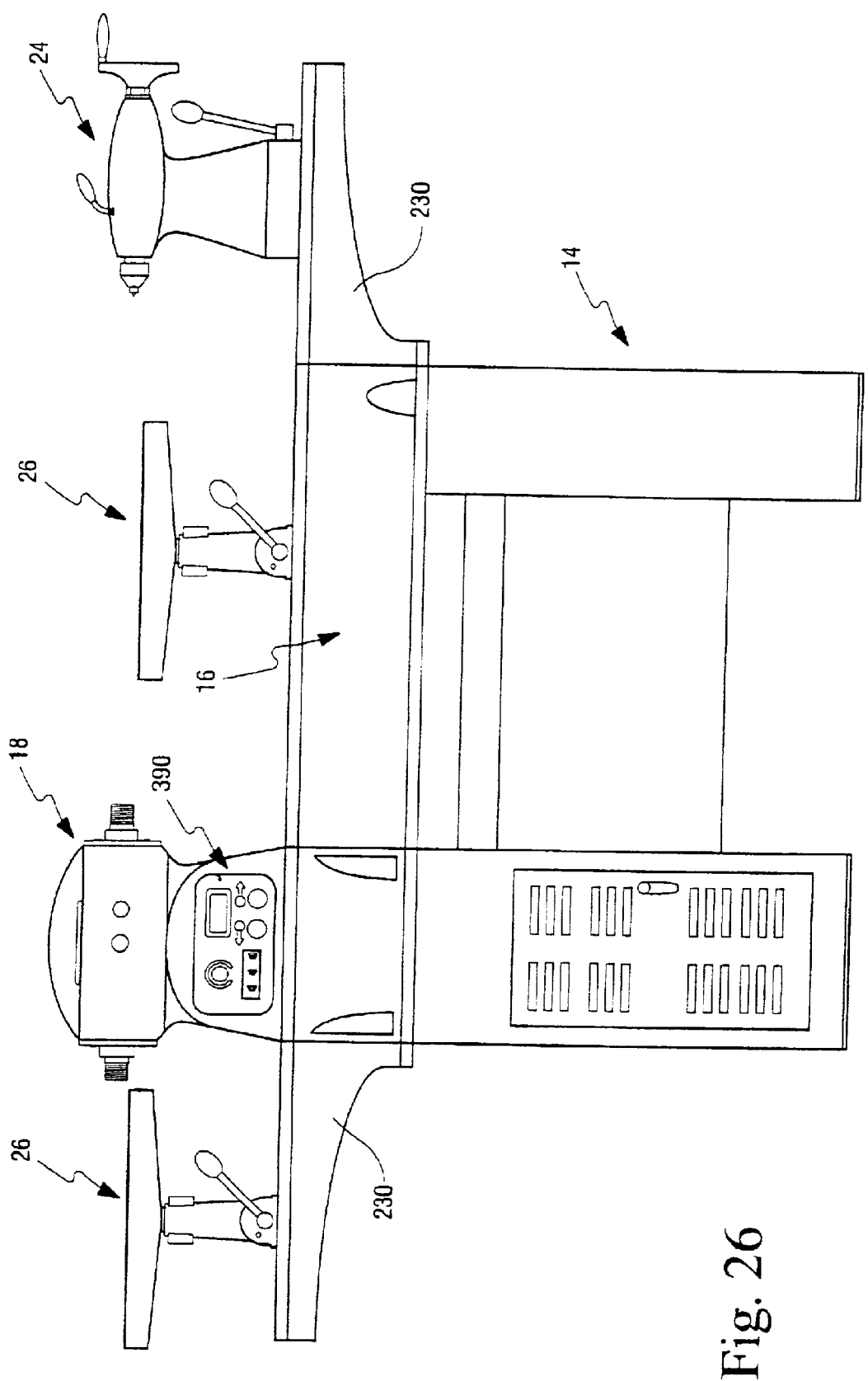
FIGS. 26–29 are front elevational views of lathe assemblies according to the invention incorporating various combinations of lathe beds and accessories.

Also shown in FIG. 14 is an 18 inch inboard bed extension 230 and an elongated, 40 inch accessory inboard bed 232. Either the inboard bed extension or the inboard accessory is secured to the second longitudinal end 184 of the lathe bed by bed bolts 206 and washers 208 as described above with reference to the outboard bed assemblies. Again, alignment pins 210 for being received in alignment holes are advantageously provided for aligning the bed assemblies, it being understood that proper alignment of the bedways is necessary for accessories to be displaced from one bedway to another longitudinally aligned therewith. The second longitudinal end 236 of the inboard bed assembly is secured by a support bolts 214 and washers 216 to an accessory inboard bed support 234 which may be in turn bolted to the floor of the workshop or other wood working facility. As illustrated in FIG. 26, the inboard bed extension 230 may in the alternative be mounted as a bed extension on the outboard side for workpieces of truncated length so as to not require a tailstock assembly. In addition, as illustrated in FIG. 29, both an inboard bed 232 and an inboard bed extension 230 may be mounted one to the other to accommodate particularly long workpieces. Although not illustrated, as a further alternative the inboard extension 232 may be mounted as an outboard extension to the first longitudinal end of either the 18 inch or 36 inch outboard bed.

While exemplary inboard and outboard bed extensions and assemblies have been described with reference to presently preferred dimensions of 18 inches, 36 inches and 40 inches, it is to be understood that bed extensions of other lengths may be provided without departing from the invention, with the view that a modular design as described herein increases the versatility of the assembly and allows a variety of work sizes to be accommodated, e.g., in a hobbiest's workshop. In a presently preferred embodiment, the beds are made of Meehanite, a cast iron made from a patented controlled undercooling process that ensures a superior, consistent grade of casting material with internal lubricating graphite agents for a smoother, friction-free surface on the bedways.

Figure 15:
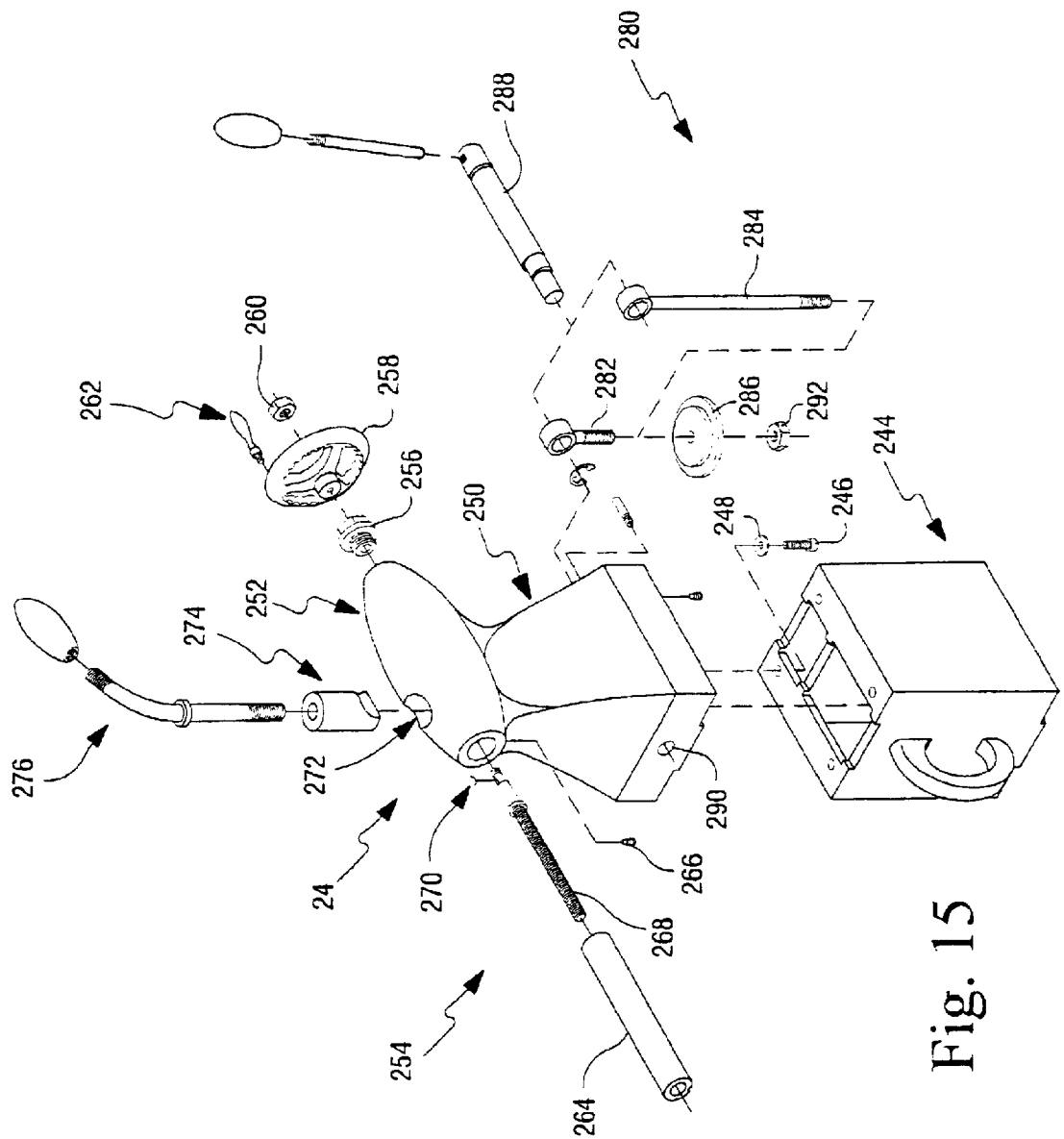
FIG. 15 is an exploded perspective view of a tailstock assembly embodying the invention.

A tailstock assembly 24 provided in accordance with the invention is illustrated in the exploded view of FIG. 15. As illustrated in FIGS. 28 and 29, the tailstock assembly 24 may be provided inboard and/or outboard as deemed necessary or desirable. When the tailstock assembly is provided outboard, an accessory riser block assembly 244 can be secured by a tailstock riser bolts 246 and associated washers 248 the inboard tailstock assembly 24 to increase the height of the tailstock assembly 24 commensurate with the lower height of the outboard bed 202, as illustrated. Similar to the headstock assembly, the tailstock assembly 24 includes a continuously curved housing portion 252 for housing the quill assembly 254 and a support housing part 250 defining a transition from the continuously curved quill housing 252 to the more rectangular lathe bed 16, 202, 230, 232 and/or riser assembly 244 configuration. Thus, the quill housing portion 252 is generally elliptical in longitudinal section and generally circular in transverse cross-section to define a generally continuously curved outer surface which may be comfortably leaned on by the operator and provides an aesthetically pleasing, sleek design.

Mounted to one end of the tailstock housing is a tailstock nut 256 to which the handwheel 258 is secured by handwheel nut 260. A handwheel handle 262 is secured to the handwheel 258 to allow manual rotation of a workpiece secured to the quill assembly 254 The quill assembly 254 includes the quill 264, the quill tracking screw 266 and a quill screw 268 and the quill screw woodruf key 270. Extending through an aperture 272 in the upper surface of the tailstock quill assembly housing is a quill lever clamping sleeve 274 for receiving the quill locking lever 276. In an exemplary embodiment, the tailstock assembly 24 has a 4½" diameter chrome plated handwheel 258 and a self-ejecting 1½" diameter quill 264 with a full 5" of quill travel.

The tailstock assembly 24 is selectively locked at a prescribed position in the bedway of the lathe bed 16, inboard bed 230, 232 or outboard bed 200, 202 with a clamp locking assembly 280. In the illustrated embodiment, a shaft locking assembly is provided that is comprised of an eyebolt 282 or 284, locking plate 286 and eccentric locking shaft 288. Because the tailstock assembly 24 is selectively mounted to a riser assembly 244, in the illustrated embodiment, first and second eyebolt nuts 282, 284 are provided, one 282 for the tailstock assembly alone and one 284 for the tailstock assembly 24 when mounted to the riser assembly 244. The locking shaft 288 is inserted through bores 290 (only one of which is shown in FIG. 15) that are diametrically opposed at the base of the tailstock assembly 24 so that the locking shaft can be rotated clockwise and counterclockwise with respect to the longitudinal axis of the tailstock assembly. The locking shaft is threaded through a respective one of the eyebolts 282, 284 depending upon whether the riser assembly 244 is provided. Because the locking shaft 288 is eccentrically formed, rotating the locking shaft through, e.g., 90 degrees will selectively lift or lower the eyebolt according to the displacement of the eccentric shaft. The eyebolt extends through locking plate 286 which is disposed in the bedway of the bed to which the tailstock assembly is to be secured. A bolt 292 determines the position of the locking plate with respect to the shaft of the eyebolt. Thus, by properly determining the position of the locking plate, rotation of the locking shaft assembly e.g., 45 degrees to the left of center drops the eyebolt and the locking plate 286 secured thereto so that the tailstock assembly 24 can be slidably displaced with respect to a bedway or removed entirely from the bedway. Then, rotating the locking shaft 90 degrees in the other direction, e.g., so as to be 45 degrees to the right of vertical center, lifts the eyebolt so that the locking plate 286 clamps against the bedway to lock the tailstock assembly in position. As will become apparent below, the locking shaft assembly of the tailstock assembly generally corresponds to the locking shaft assembly provided for the inboard tool rest assembly, described below. However, as an alternative to the locking shaft assembly shown in FIG. 15, an improved clamping assembly as provided in the outboard tool rest assembly of the invention may be similarly incorporated to advantage in the tailstock assembly and/or the inboard tool rest assembly.

Figure 16:
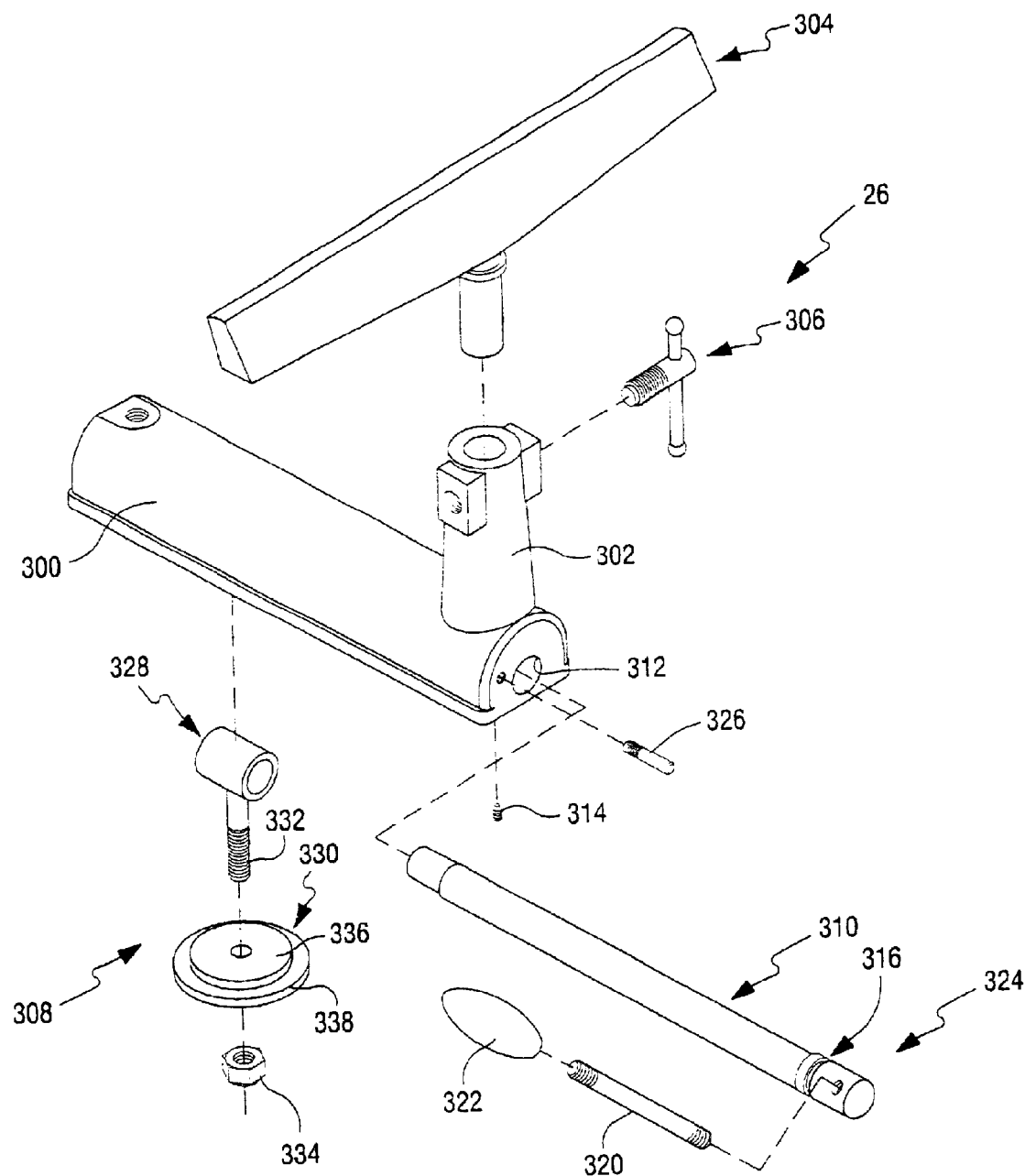
FIG. 16 is an exploded perspective view of an inboard tool rest in an embodiment of the invention.

An inboard tool rest 26 provided in accordance with an exemplary embodiment of the invention is illustrated in FIG. 16. The inboard tool rest assembly includes an inboard tool rest base casting or main body 300 which is adapted to be disposed with its longitudinal axis generally transverse to the longitudinal axis of the associated bed, so that it underlies the workpiece being turned on the lathe. A tool rest support housing 302 projects generally upwardly from the tool rest base casting for receiving one of a plurality of tool rests 304. In the illustrated embodiment, a tool support clamp 306 is provided for selectively clamping a tool rest within the tool support housing 302. In the illustrated embodiment, a 16 inch tool rest 304 is shown although it is to be understood that any one of a plurality of tool rests may be selectively provided in the tool rest support. Thus, in a preferred embodiment, a tool rest set including a plurality of tool rests such as a 4 inch, 6 inch, 12 inch and 16 inch tool rest is provided, any one of which is mounted to the tool rest for a particular project.

Figure 17:
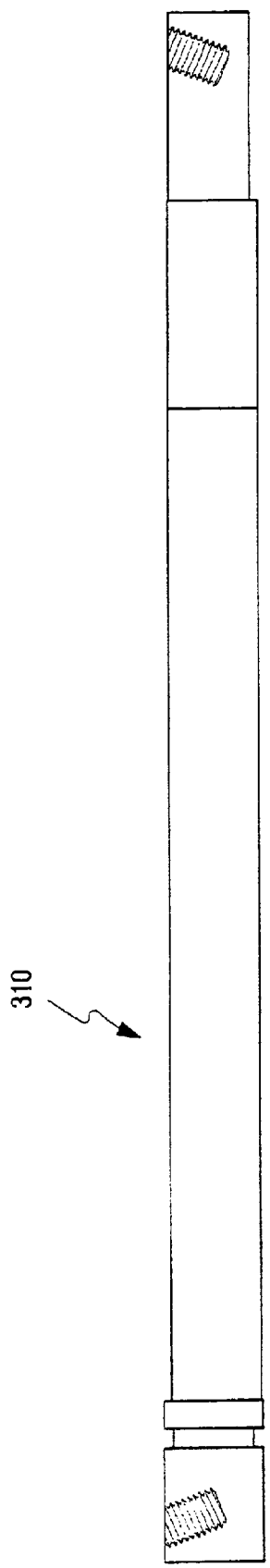
FIG. 17 is a side view of the inboard tool rest locking shaft.
Figure 18:
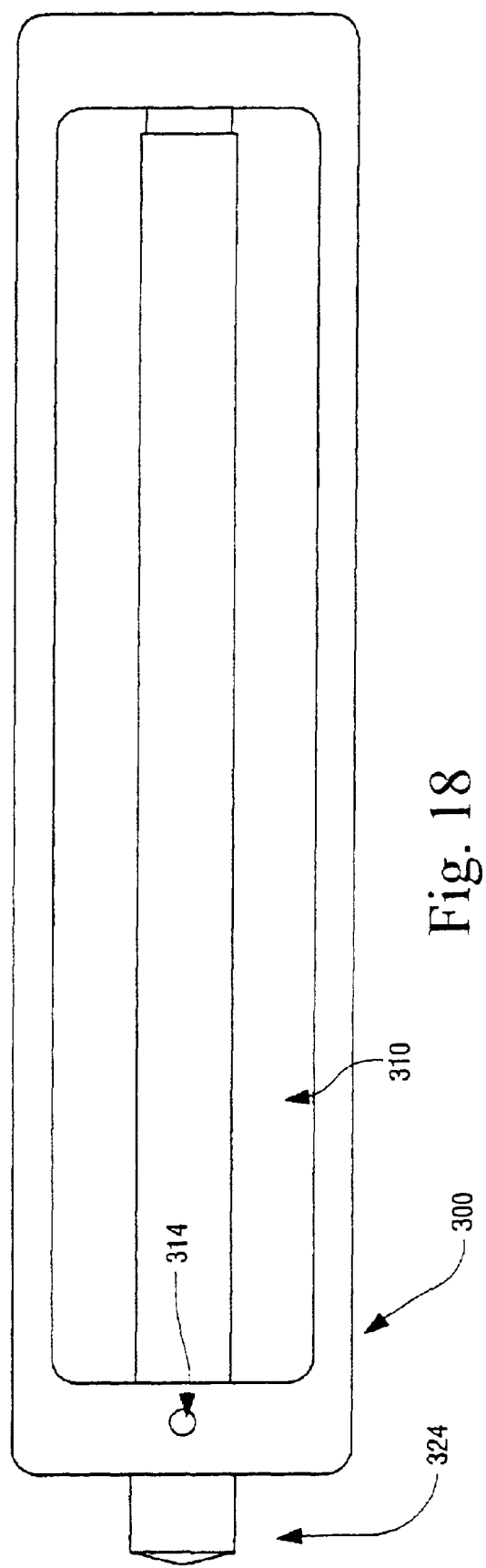
FIG. 18 is a bottom plan view of the inboard tool rest main body showing the locking shaft secured thereto.

To selectively lock the inboard tool rest 26 to the associated bedway, a locking clamp assembly 308 is provided. In the illustrated embodiment, as shown in FIG. 17 and 18 in particular, the tool rest base casting or main body 300 is generally hollow having an open bottom. An eccentric locking shaft 310 is received in apertures 312 defined at each longitudinal end of the tool rest base. A positioning screw 314 is provided for being seated in a groove 316 defined in the locking shaft 310 to preclude longitudinal displacement of the locking shaft 310 with respect to the housing 300. A locking lever 318, which may include a shaft or lever arm 320 and a lever knob 322 is engaged with one projecting end 324 of the locking shaft 310. In the illustrated embodiment, a locking shaft rest pin 326 is inserted at one longitudinal end of the housing offset at an angle of about 45 degrees to vertical for defining a limit of lever movement for unlocking the tool rest 26 with respect to the associated bed assembly, as described in greater detail below. Rotating the locking lever from the unlocked position defined by the rest pin about 90 degrees in a clockwise direction will effectively lock the inboard tool rest to the associated bed, in a manner similar to the clamp locking assembly 280 of the tailstock assembly.

Figure 19:
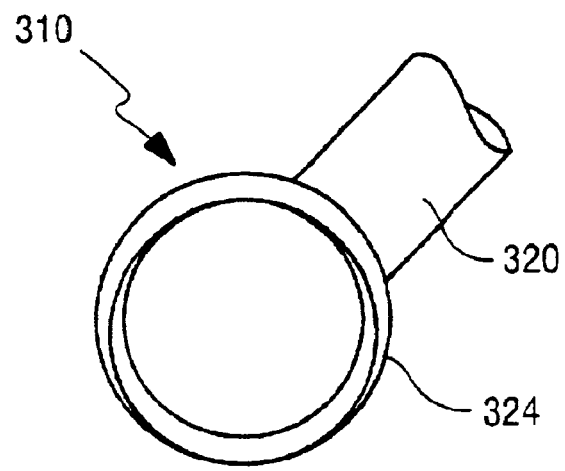
FIG. 19 is a schematic illustration of the locking of the inboard tool rest in its unlocked position.
Figure 20:
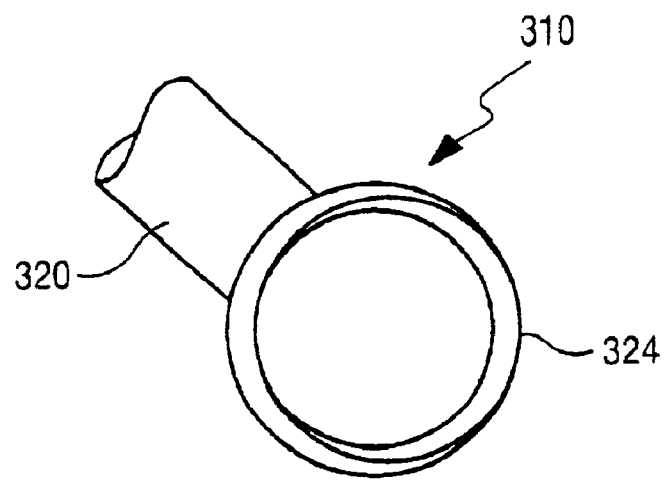
FIG. 20 is a schematic illustration showing the locking shaft rotated to its locked position.

As mentioned above, the locking shaft 310 is an eccentric shaft as best shown in FIGS. 17, 19 and 20. The eccentric locking shaft is threaded through eyebolt 328 which is disposed in the hollow interior of the housing 300. A locking disk 330 is received on the shaft 332 of the eyebolt 328 and positioned with respect thereto by the locking shaft eyebolt nut 334. According to the eccentricity of the locking shaft, when the locking lever 318 is resting on the resting pin, so as to be disposed at an angle of about 45 degrees left of center as shown in FIG. 19, the eyebolt 328 is in its vertically lowest position so that the locking plate 330 is displaced to be positioned below and out of locking engagement with the bedway of the associated bed. When the locking shaft is rotated about 90 degrees in a clockwise direction as shown in FIG. 20, due to the eccentric configuration of the shaft 310, a cam is defined for lifting the eyebolt with respect to the bedway to bring the locking plate into locking engagement with the undersurface of the bedway and thus to lock the tool rest with respect to the bedway.

The locking disk 330 of the inboard tool rest 26 defines a recessed step for engaging the bedway of the associated bed. As will be understood, the resulting raised portion 336 of locking plate 330 is adapted to be received in the slot or opening of the bedway whereas the flange 338 defined by the step is adapted to underlie the bedway on each lateral side of the slot, to remain in proper position and to provide effective clamping.

While effective locking can be provided with the clamping assembly 308 provided above and illustrated in FIGS. 16–20, a potential disadvantage of such a clamping assembly is that the portion of the shaft 310 disposed through the eyebolt 328 is otherwise unsupported and, thus, a bowing of the locking shaft can result from the clamping effect. Accordingly, an improved clamping assembly 342 is provided in the outboard tool rest 340 of the illustrated embodiment. The illustrated outboard tool rest clamping assembly 342 is a presently preferred clamping assembly that may be used for all bedway accessories of the lathe apparatus.

Figure 21:
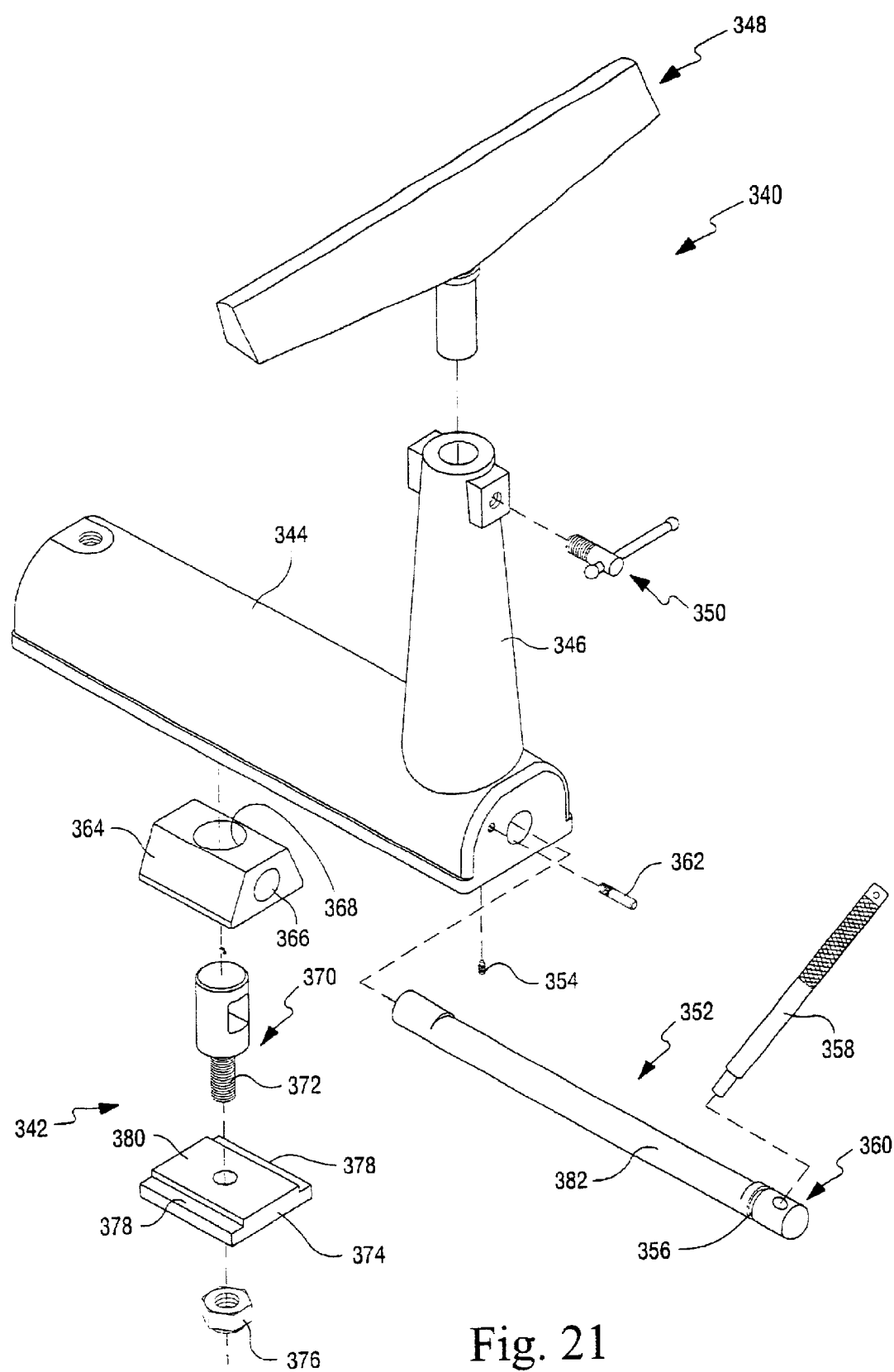
FIG. 21 is an exploded perspective view of an out tool rests according to the invention and illustrating an improved clamping mechanism according to the invention.

The outboard tool rest 340 provided in accordance with a presently preferred embodiment of the invention has a unique sliding piston locking system 342 that eliminates shaft-flex thereby ensuring a creep-free positive lockdown under the heavy impacts of large diameter outboard turning. Referring more specifically to FIG. 21, the outboard tool rest 340 includes an outboard tool rest base casting or main body 344 which is adapted to extend generally transverse to the longitudinal axis of the associated bed to underlie a workpiece mounted to the headstock 18 and tail stock 24. A tool rest support housing 346 projects at an angle of about 90 degrees with respect to the main body for selectively receiving one of a plurality of tool rests 348. Several tool rest sizes may be provided. In an exemplary assembly, five tool rest sizes are provided: 4", 6", 12" and 16", which may also be used as inboard tool rests and a heavy 18" outboard tool rest for very large work. Advantageously, the tool rests all have 1¼" diameter posts so they will each fit in both the inboard and outboard tool rest supports. Again a tool support clamp 350 is provided for selectively locking a selected tool rest in the tool rest support housing.

A shaft 352 defining a part of the clamping assembly 342 is received in the main body 344 of the tool rest housing and is rotatably supported at each longitudinal end of the main body. A set screw 354 is provided for being received in a groove 356 to preclude longitudinal displacement of the locking shaft with respect to the main body of the housing. A shaft locking handle 358 is engaged with the first longitudinal end 360 of the locking shaft 352 and a locking lever rest pin 362 is provided for defining the unlocked position of the locking shaft 352, as described in greater detail below. The clamping assembly 342 further includes a slider block slidably received within the hollow main body 344 of the outboard tool rest. The slider block has a longitudinal bore 366 for receiving the locking shaft 352 and a transverse, vertical bore 368 for receiving a locking piston 370. The locking piston 370 includes a bore 371 for receiving shaft 352 and a threaded shaft 372 to which a locking plate 374 is fitted. A locking plate nut 376 is provided for defining the lower limit of the locking plate 374.

In this embodiment, the locking plate 374 is generally rectangular defining first and second flanges 378 and a raised central portion 380. The raised central portion is for being received in the bedway slot with a flange defined under each lateral edge of the bedway slot. It is to be understood that for the outboard tool rest to be disposed transverse to the longitudinal axis of the bedway, on assembly, the locking plate will be rotated 90 degrees from the position shown in FIG. 21.

Figure 22:
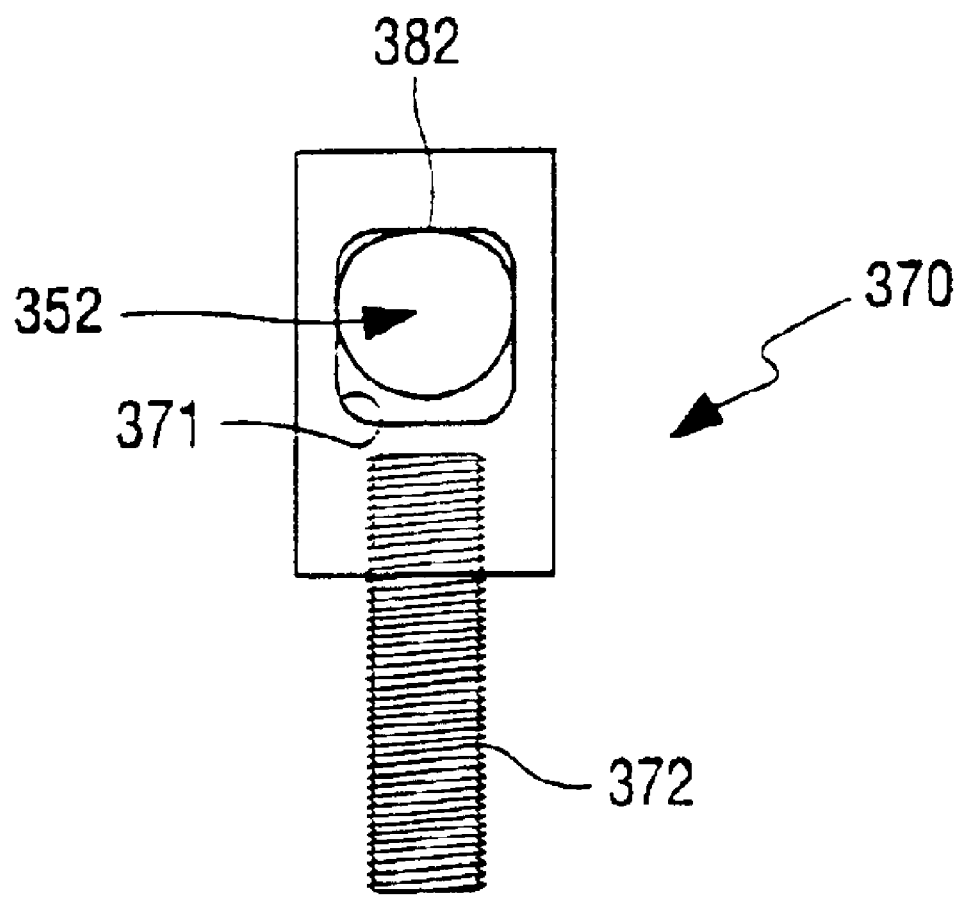
FIG. 22 is an elevational view of the outboard tool rests locking piston according to the invention.
Figure 23A:
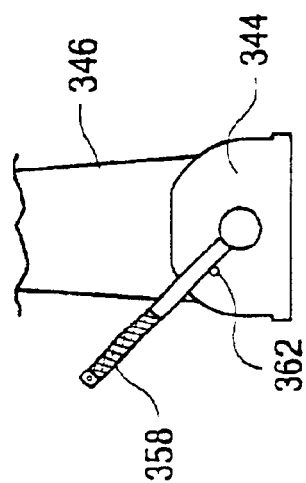
FIGS. 23 and 23a schematically illustrate the outboard tool rest shaft in its unlocked position.
Figure 23:
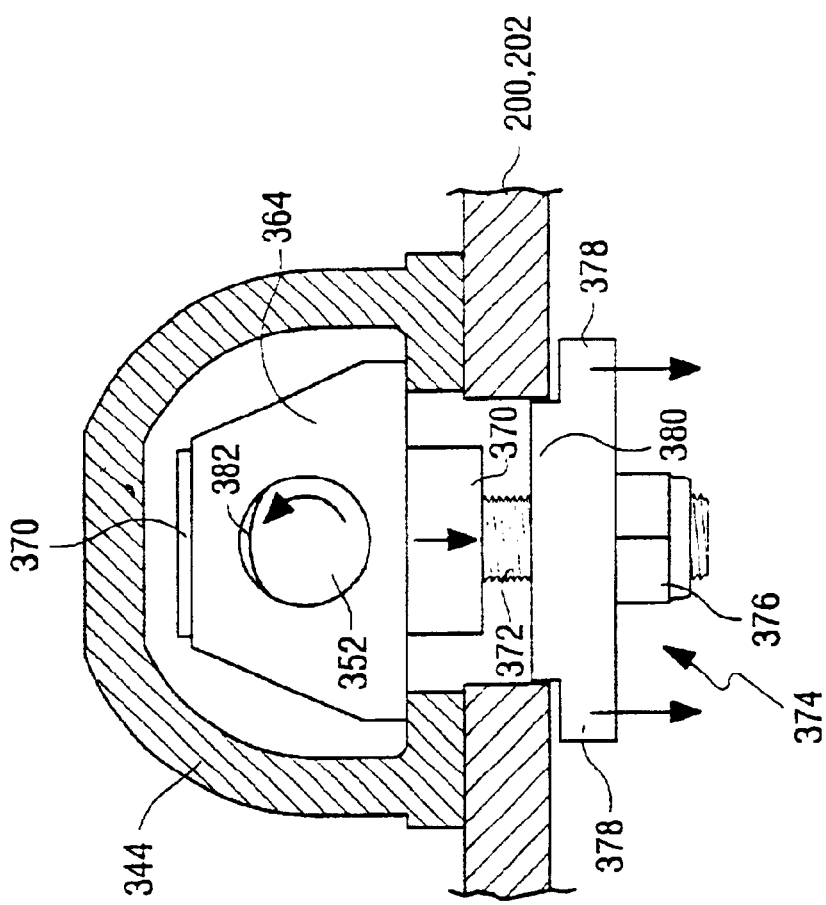
Figure 24A:
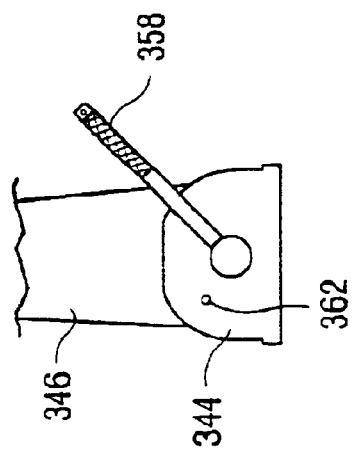
FIGS. 24 and 24a schematically illustrate the outboard tool rest shaft in its locked position.
Figure 24:
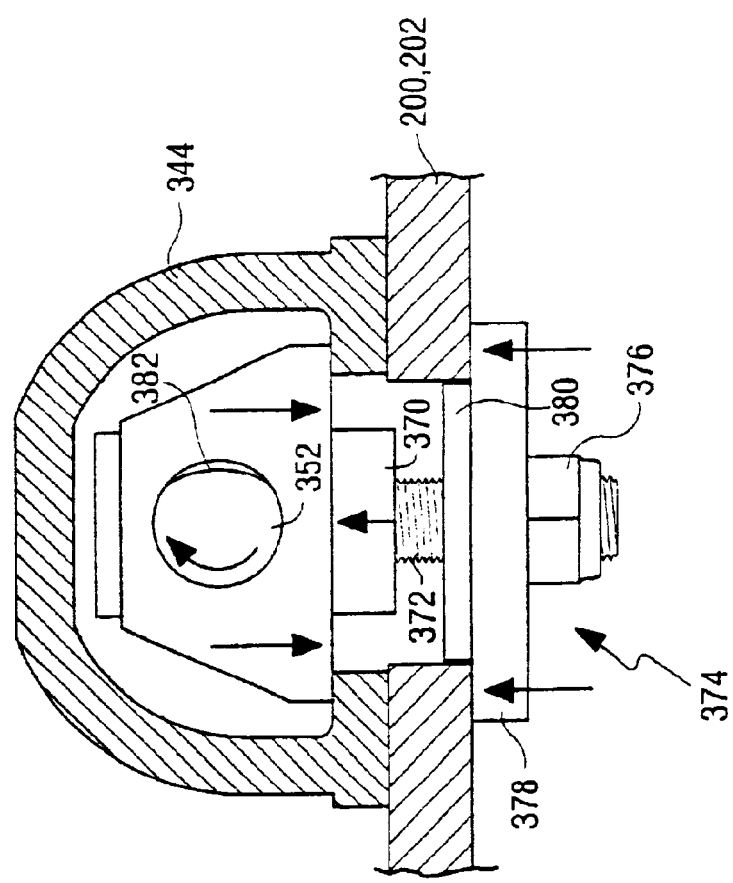

The locking shaft 310 of the inboard tool rest 26 is generally circular in cross section but eccentrically disposed with respect to axis of rotation thereof to provide a camming effect as shown in FIGS. 19 and 20. The locking shaft 352 of the locking assembly 342 shown in FIG. 21, on the other hand, is eccentrically configured so as to have a non-circular cross-section. This can best be seen from the schematic cross-sectional views of FIGS. 22, 23 and 24. Because the locking shaft is configured to have a part circular cross-section and a generally flattened upper surface 382, as can be seen from the perspective view of FIG. 21 and 22, when the shaft is in the unlocked position shown in FIGS. 23 and 23a and defined by the rest position pin 362, the piston 370 to which the locking plate 374 is mounted will be disposed in its vertically lowest position so that the locking plate 374 is displaced from the bedway of, e.g., the outboard bed 200, 202. In this position, the tool rest assembly 340 can be mounted to and demounted from the bedway and/or the main body 344 of the tool rest can be displaced with respect to the slider block to determine its position with respect to the workpiece. Once the tool rest assembly is properly positioned and it is desired to lock the same in place, the locking handle 358 is rotated, for example, about 90 degrees with respect to its unlocked position, the position shown in FIG. 24a in the illustrated embodiment. The clockwise rotation of the locking shaft lifts the locking piston 370 while opposing displacement of the slider block, to effectively clamp the main body 344 and the bedway between the slider block 364 and the locking plate 374. This effectively prevents the locking shaft 352 from flexing.

In the presently preferred embodiment, all of the tool rests are made of Meehanite and the rounded tops of the rests are surface-hardened to RC60 to help minimize pits and other surface damage from high-speed steel wood turning tools.

To install the lathe, the lathe is first positioned so that there is plenty of unobstructed space around the machine. The lathe can either be bolted to the floor or left free to absorb off-balanced loads. Small shims may be used to advantage to level out any twist, preferably under one side of the bottom plate of the extension support. A permanently bolted lathe will be more rigid and is fine for average bowl and spindle turning. When turning extremely heavy blocks of wood, however, casting damage can occur if the lathe is held rigid and the load is too heavy and off-balanced. The lathe will typically be equipped with an line-in cable and a 220v plug but a fixed, heavily shielded cable which can withstand the effects of a large block of wood falling on the cable may be permanently installed instead.

As is apparent from the description above, all of the components and accessories to the lathe are provided separately and can be added as deemed necessary or desirable. To mount the extension beds, the two alignment pins 210 are used to line up the beds and hold them in position. If necessary, a temporary support structure may be used to hold up the bed. The two bed end faces are then moved together and the bolts 206 finger secured. If provided, the accessory bed support is then attached to the other end of the bed, and the assembly adjusted for level.

For the 18" and 36" outboard bed extensions 200, 202, an outboard tailstock 24/244 is slid onto the bedways. The operator then installs a drive center in the headstock and a revolving or dead center (with a center point) in the tailstock and checks that the two points are in alignment. If necessary, the bed is adjusted up or down and side to side until the center points are aligned. The mounting bolts 206 are tighten once positioning is complete.

For the 18" and 40" inboard bed extensions 230, 232 and for compounded outboard beds, the beds are lightly bolted in place using the above procedures. A tailstock is then slid onto the bedways and adjusts are made for a smooth transition across the joint between the beds, e.g., using a rubber mallet. The mounting bolts 206 are tighten once positioning is complete.

To change the drive belt the headstock spindle shaft 20 needs to be pulled or pushed in the direction of the lathe bed until the outboard spindle clears the inside of the outboard housing. Then the old belt can be slipped off and a new belt replaced. The spindle then needs to be pushed back into the housing.

The spindle shaft can be removed using the tailstock. More particularly, the tailstock can be used to push the shaft from the outboard side toward the lathe bed. One can use either an outboard tailstock 24/244 on the outboard bed or an inboard tailstock 24 on an 18" inboard bed extension 230 that is mounted on the outboard side, as follows: 1) Open the headstock cover 150 and remove the retaining pins 104 on the two shaft locking pins 98 and remove the locking pins. 2) Remove the indexing ring 120 from the indexing disk 114. 3) Loosen the set screws 70, 90, 116 on the belt pulley 60, the shaft locking disk 88, and the indexing disk 114. 4) Remove the keys 68, 92, 118 or keep the shaft in the upright position so they won't fall out. 5) Remove the inboard bearing cover 70. 6) Make sure there is no center in the tailstock quill and move the tailstock up against the outboard spindle and tighten the tailstock 24 down on the bed. 7) Turn the tailstock handwheel forcing the spindle shaft 20 out of the housing until the shaft comes free. 8) Do not remove the shaft from the housing. Simply remove and replace the pulley belt.

The spindle shaft is installed using the following procedures. 1) After the belt is replaced, lift and push the spindle shaft 20 into alignment with the outboard bearing 54. 2) Make sure there is no center in the inboard tailstock quill and move the tailstock up against the inboard spindle and tighten the tailstock down on the bed. 3) Turn the tailstock handwheel forcing the spindle shaft back into the housing. Make sure that the 0.004" preload shim 74 stays centered and doesn't get bent as it moves into the housing. Keep pressing the shaft in until the bearing seats against the housing counterbore. 4) Replace the keys if removed. 5) Move the pulley 60 against the shoulder on the spindle shaft and tighten the set screw 70. 6) Position and tighten the set screws on the locking disk 88 and indexing disk 114. 7) Replace the indexing ring 120. 8) Replace the shaft locking pins 98 and retaining pins 104. 9) Replace the inboard bearing cover 80.

As will be appreciated from the foregoing description, the lathe provided in accordance with the invention is designed to address the needs of today's bowl and spindle turners, by providing a basic lathe assembly with a number of accessory bed extensions along with an outboard tool rest and tailstock. In an exemplary embodiment, the lathe of the invention comes equipped with a 2 hp DC BALDOR motor and a state-of-the-art 3 hp MINARIK pulse-width modulated (PWM) motor drive. It has a continuous power rating of 2 hp and an effective intermittent power rating of nearly 3 hp.

Since the lathe has a reversible DC drive, both the inboard and outboard spindles rotate in the standard counter-clockwise direction when turning. An inboard/outboard switch (forward/reverse) is preferably located inside the lathe cabinet and lights on the control panel indicate which mode is currently in use.

A master on/off switch (not shown) is advantageously located on the side panel of the lathe cabinet for safety. However, in an exemplary embodiment, the control panel, schematically shown at 390, also has momentary on and off switches. Dynamic braking is built into the system. In addition to inboard and outboard light indicators (as mentioned above), the control panel may also include a speed control knob and a panel tachometer with a digital readout. A remote on/off switch may optionally be provided to magnetically attach to any part of the lathe. More specifically, a remote on/off switch (not shown) may be provided which attaches to a relay box inside the lathe cabinet. The cable is pushed through the 1¼" diameter hole and rubber bushing 42 in the bottom right side of the cabinet and plugged into the relay box. The remote switch can then be magnetically attached to any portion of the lathe.

As mentioned above, in an exemplary embodiment, the lathe is equipped with a premium 2 hp DC BALDOR motor and a 3 hp pulse-width modulated (PWM) speed controller produces an effective power rating of 3 hp. The control has a speed range of 100:1 maintaining torque over the entire range, particularly at low speeds. A three-step pulley 60 provides speed ranges of 0 to 600 rpm, for large bowl turning, 0 to 1200 rpm for standard bowl turning, and 0 to 2000 for high-speed bowl turning and finishing. The digital panel tachometer provides an instant display of spindle rpm's. In an exemplary embodiment, the speed controller utilizes adjustable trim pots in order to regulate specific drive parameters. These include acceleration and deceleration times, maximum and minimum speed settings, current limit and voltage (IR) compensation trim pots. The IR comp trim pot allows one to adjust the amount of voltage available to the motor armature in response to current changes. When a load is applied such as a deep gouge cut, the drive should respond to the load with an increase in torque. When the gouge is removed, the torque should decrease and the motor speed should remain even without a speed spike. An exemplary controller is the MINARIK 3 hp pulse-width-modulated (PWM) DC drive. It has a form factor of 1.05 over a 100:1 speed range. Form factor is a figure that indicates how much the current departs from pure DC or, from a practical standpoint, how much current is lost to the system as heat instead of torque. A form factor of one has no current loss. Standard SCR DC drives typically have a form factor of 1.37 but the PWM form factor of 1.05 produces almost pure DC current that doesn't deteriorate as the speed reduces. All this translates into maximum torque at low speeds.

As described above, several lathe configurations are possible, depending on the number of beds and accessories provided. In an exemplary embodiment, the basic lathe 10 has a 20" diameter swing and a 30" bed length with 20" between centers. The accessory inboard bed extension 230, of for example 18" in length, may be provided to bring the total distance-between-centers to a standard 38". The inboard bed accessory 230 can also be used on the outboard side for small bowl turning. The optional, e.g., 40" inboard bed extension 232 may further be provided and can be compounded for extra-long spindle work. All beds can also be compounded for longer work.

The accessory outboard bed assemblies 200, 202 are specifically designed for turning very large forms up to 36" in diameter. In one assembly, shown in FIG. 27, an 18" outboard bed 200, bed support 204 and tool rest 340 are provided. In another assembly, shown in FIG. 28, a 36" outboard bed 202, bed support 204, outboard tool rest 340 and tailstock 24/244 are provided. The assembly illustrated in FIG. 29 includes all of the accessory beds, components and accessories mentioned above, to provide for extensive inboard and outboard turning.

Standard Operating Procedures

Make sure that the belt is on the desired pulley and that the indexing pin is in the 'disengaged' position before turning on the lathe. In a presently preferred embodiment, the lathe cabinet door has a safety switch (not shown) and must be closed for lathe operation. Turn on the Master Switch (not shown in the illustrated view, but advantageously located on the front/inside of the lathe cabinet. The two indicator lights on the control panel will show whether the assembly is in 'Inboard' or 'outboard' (forward/reverse) mode. The desired mode is set, e.g. using the mode switch (not shown) mounted on a relay box (not shown) that is located inside the cabinet.

Set the speed knob to 'zero' and turn on the lathe by pushing the 'On' button located on the control panel. Increase the speed using with the speed knob on the control panel. The digital tachometer shows the rpm of the spindle shaft. You can turn the speed knob down to zero or push the 'Off' switch on the control panel to turn the lathe off. In a conventional manner, if the speed knob is left on, the lathe will increase to the speed indicated on the speed knob when the lathe is turned back on.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A lathe assembly comprising:
   a base unit having first and second longitudinal ends;
   a headstock assembly comprising a housing and a spindle shaft assembly extending therethrough and rotatably mounted thereto, said spindle shaft having a longitudinal axis;
   a first bedway defined on said base unit for selectively receiving at least one of a tailstock and a tool rest assembly, said first bedway generally extending from said headstock assembly toward said second end of said base unit, said first bedway having a longitudinal axis parallel to the longitudinal axis of the spindle;
   a shaft locking assembly secured to said spindle shaft for selectively locking said spindle shaft with respect to said housing at 90 degree intervals; and
   an indexing assembly for angularly positioning and holding said spindle shaft with respect to said housing at any one of a plurality of intervals intermediate said 90 degree intervals of said shaft locking assembly, said indexing assembly including an indexing component fixedly secured to said spindle shaft and an indexing pin mounted to said housing of said headstock assembly.

2. A lathe assembly as in claim 1, wherein said indexing component has a plurality of indexing points defined about an outer peripheral surface thereof for receiving a tip of said indexing pin.

3. A lathe assembly as in claim 2, wherein said indexing component comprises an indexing disk fixedly secured to said spindle shaft and an index ring detachably secured to said indexing disk, said indexing ring being formed in two parts, and wherein said indexing paints comprise recesses defined in an outer peripheral surface of said indexing ring.

4. A lathe assembly as in claim 1, wherein said indexing pin is spring urged inwardly of said housing, towards said indexing component.

5. A lathe assembly as in claim 4, wherein an indexing pin housing is defined in the wall of the headstock housing for slidably receiving said indexing pin, and wherein a projecting stop is provided on said indexing pin for selectively engaging one of two slots in said indexing pin housing to define an engaged and a disengaged position of said indexing pin with respect to said indexing component.

6. A lathe assembly as in claim 1, further comprising a second bed assembly operatively coupled to at least one of said first and second longitudinal ends of said base unit, said second bed assembly including a second bedway for selectively receiving at least one of a tailstock and a tool rest assembly, said second bedway being axially aligned with said first bedway.

7. A lathe assembly as in claim 6, further comprising a tool rest assembly selectively slidably disposed in one of said first bedway and said second bedway, and a locking assembly for selectively locking said tool rest assembly to said bedway.

8. A lathe assembly as in claim 7, wherein said tool rest assembly includes a tool support housing extending vertically from a tool rest main body, said tool rest main body comprising a tool rest housing and a locking assembly for selectively locking said tool rest housing to the bedway, said locking assembly including a locking plate for engaging an undersurface of the bedway; a slider block seated and disposed within said tool rest housing, a non-circular locking shaft extending longitudinally of said housing and disposed through a bore in said slider block, and a locking piston vertically slidably disposed in said slider block, said locking piston having a bore for being aligned with said bore of said slider block to receive said locking shaft and having a shaft for being detachably mounted to said locking plate, whereby rotation of said locking shaft about the longitudinal axis thereof lifts said locking piston and the locking plate mounted thereto while pressing said block so as to clamp said housing to the bedway.

9. A lathe assembly as in claim 1, further comprising a first tailstock assembly selectively slidably disposed in said first bedway, said first tailstock assembly including a quill housing portion having a quill assembly rotatably disposed therein and axially aligned with said spindle shaft of said headstock assembly.

10. A lathe assembly as in claim 9, wherein at least one of the quill housing portion of the first tailstock assembly and a portion of the headstock assembly housing the spindle shaft is generally elliptically shaped in longitudinal section and generally circularly shaped in transverse cross section so as to define a generally continuously curved outer peripheral surface.

11. A lathe assembly comprising:

a base unit having first and second longitudinal ends, a headstock assembly provided adjacent said first longitudinal end of said base unit, said headstock assembly including a spindle housing having a spindle shaft extending therethrough, a first lathe bed assembly provided on said base unit and including a bedway extending longitudinally in a direction parallel to said longitudinal axis of said spindle for slidably receiving at least one of a tool rest and a tailstock;

a second lathe bed assembly detachably coupled to at least one of said first and second longitudinal ends of said base unit, said second bed assembly including a second bedway for selectively receiving at least one of a tailstock and a tool rest assembly; and a second base unit mounted to and supporting a longitudinal end of said second lathe bed assembly remote from said first base unit.

12. A lathe assembly comprising:

a base unit having first and second longitudinal ends, a headstock assembly provided adjacent said first longitudinal end of said base unit, said headstock assembly including a spindle housing having a spindle shaft extending therethrough, a first lathe bed assembly provided on said base unit and including a bedway extending longitudinally in a direction parallel to said longitudinal axis of said spindle for slidably receiving at least one of a tool rest and a tailstock;

a second lathe bed assembly detachably coupled to at least one of said first and second longitudinal ends of said base unit, said second bed assembly including a second bedway for selectively receiving at least one of a tailstock and a tool rest assembly; and a first tailstock assembly selectively slidably disposed in said first bedway, said first tailstock assembly including a quill housing portion having a quill assembly rotatably disposed therein and axially aligned with said spindle shaft of said headstock assembly, and wherein at least one of the quill housing portion of the first tailstock assembly and the spindle housing of the headstock assembly is generally elliptically shaped in longitudinal section and generally circularly shaped in transverse cross section so as to define a generally continuously curved outer peripheral surface.

13. A lathe assembly comprising:

a base unit having first and second longitudinal ends, a headstock assembly provided adjacent said first longitudinal end of said base unit, said headstock assembly including a spindle housing having a spindle shaft extending therethrough, a first lathe bed assembly provided on said base unit and including a bedway extending longitudinally in a direction parallel to said longitudinal axis of said spindle for slidably receiving at least one of a tool rest and a tailstock;

a second lathe bed assembly detachably coupled to at least one of said first and second longitudinal ends of said base unit, said second bed assembly including a second bedway for selectively receiving at least one of a tailstock and a tool rest assembly; and an indexing assembly for angularly positioning and holding said spindle shaft with respect to said spindle housing at any one of a plurality of intervals, said indexing assembly including an indexing component fixedly secured to said spindle shaft and an indexing pin mounted to said spindle housing of said headstock assembly, and spring urged toward engagement with said indexing component.

14. A lathe assembly comprising:

a first base unit having first and second longitudinal ends and including a first lathe bed assembly having first and second longitudinal ends and a first bedway defined therein for slidably receiving at least one of a tool rest assembly and a tailstock assembly;

a headstock assembly mounted to said base unit, said headstock assembly including a spindle housing portion having a spindle shaft rotatably disposed therein;

a first tailstock assembly selectively slidably disposed in said first bedway, said first tailstock assembly including a quill housing portion having a quill assembly rotatably disposed therein and axially aligned with said spindle shaft of said headstock assembly;

a locking assembly for selectively locking said first tailstock assembly to said first bedway; and a second lathe bed assembly detachably secured to one of said first and second longitudinal ends of said first lathe bed assembly, wherein at least one of the quill housing portion of the first tailstock assembly and the spindle housing portion of the headstock assembly is generally elliptically shaped in longitudinal section and generally circularly shaped in transverse cross section so as to define a generally continuously curved outer peripheral surface.

15. A lathe assembly as in claim 14, further comprising a second base unit mounted to and supporting a longitudinal end of said second lathe bed assembly remote from said first base unit.

16. A lathe assembly as in claim 14, wherein a longitudinal end of said second lathe bed assembly remote from said first base unit is substantially unsupported.

17. A tool rest assembly for a lathe apparatus having a lathe bed assembly, said tool rest assembly comprising a tool support housing extending vertically from a tool rest main body, said tool rest main body comprising a tool rest housing and a locking assembly for selectively locking said tool rest housing to the lathe bed assembly, said locking assembly including a locking plate for engaging an undersurface of a bedway of the lathe bed assembly; a slider block seated and disposed within said tool rest housing, a non-circular locking shaft extending longitudinally of said housing and disposed through a bore in said slider block, and a locking piston vertically slidably disposed in said slider block, said locking piston having a bore for being aligned with said bore of said slider block to receiving said locking shaft and having a shaft for being detachably mounted to said locking plate, whereby rotation of said locking shaft about the longitudinal axis therof lifts said locking piston and the locking plate mounted thereto while pressing said block so as to clamp said housing to a bedway between the slider block and the locking plate.

18. A lathe assembly as in claim 14, in combination with a tool rest assembly selectively slidably engaged with one of said first and second lathe bed assemblies, said tool rest assembly comprising a tool support housing extending vertically from a tool rest main body, said tool rest main body comprising a tool rest housing and a locking assembly for selectively locking said tool rest housing to the lathe bed assembly, said locking assembly including a locking plate for engaging an undersurface of a bedway of the lathe bed assembly; a slider block seated and disposed within said tool rest housing, a non-circular locking shaft extending longitudinally of said housing and disposed through a bore in said slider block, and a locking piston vertically slidably disposed in said slider block, said locking piston having a bore for being aligned with said bore of said slider block to receiving said locking shaft and having a shaft for being detachably mounted to said locking plate, whereby rotation of said locking shaft about the longitudinal axis thereof lifts said locking piston and the locking plate mounted thereto while pressing said block so as to clamp said housing to a bedway between the slider block and the locking plate.

* * * * *